US012807056B2

(12) United States Patent
Cho et al.

(10) Patent No.: US 12,807,056 B2
(45) Date of Patent: Nov. 24, 2026

(54) RAMP APPARATUS FOR VEHICLE

(71) Applicants: Hyundai Motor Company, Seoul (KR); Kia Corporation, Seoul (KR); PHA Co., Ltd., Daegu (KR)

(72) Inventors: Kyu Hoon Cho, Suwon-si (KR); Jae Seung Lee, Hwaseong-si (KR); Jin Pyung Park, Seoul (KR); Min Jae Lee, Hwaseong-si (KR)

(73) Assignees: Hyundai Motor Company, Seoul (KR); Kia Corporation, Seoul (KR); PHA Co., LTD., Daegu (KR)

( * ) Notice: Subject to any disclaimer, the term of this patent is extended or adjusted under 35 U.S.C. 154(b) by 418 days.

(21) Appl. No.: 18/483,627

(22) Filed: Oct. 10, 2023

(65) Prior Publication Data

US 2024/0253552 A1 Aug. 1, 2024

(30) Foreign Application Priority Data

Jan. 30, 2023 (KR) ........................ 10-2023-0011815

(51) Int. Cl.
*B60P 1/43* (2006.01)

(52) U.S. Cl.
CPC .................................... *B60P 1/431* (2013.01)

(58) Field of Classification Search
CPC ....................................................... B60P 1/431
USPC ........................................................... 14/71.1
See application file for complete search history.

(56) References Cited

U.S. PATENT DOCUMENTS 3,268,932 A 8/1966 Hartman
3,516,103 A 6/1970 Hecker, Jr. et al.
3,756,433 A 9/1973 Richins
4,068,770 A 1/1978 Boehringer
4,078,678 A 3/1978 Tordella
4,670,928 A 6/1987 Alten
4,685,858 A * 8/1987 Manning ................ A61G 3/067 280/166
4,759,682 A * 7/1988 Hood ..................... A61G 3/061 105/433

(Continued)

FOREIGN PATENT DOCUMENTS

CA 2620211 A1 8/2008
CA 2630619 A1 11/2008

(Continued)

OTHER PUBLICATIONS

Brazos Manufacturing and Welding Services, "Work All Night With A Brazos Safety Lighted Ramp", https://brazosmanufacturing.com/work-all-night-with-a-brazos-safety-lighted-ramp/, Aug. 13, 2016, Total pp. 04.

*Primary Examiner* — Raymond W Addie
(74) *Attorney, Agent, or Firm* — Slater Matsil, LLP

(57) ABSTRACT

An embodiment ramp apparatus for a vehicle includes a housing mounted on a vehicle body, a ramp assembly movable between a stowed position in which the ramp assembly is stowed in a cavity of the housing and a deployed position in which the ramp assembly is deployed or extended from the cavity of the housing, the ramp assembly including one or more ramp platforms telescopically connected to each other, and a front cover bridging between a leading end portion of the housing and a trailing end portion of the ramp assembly in a state in which the ramp assembly is in the deployed position.

20 Claims, 34 Drawing Sheets

(56) References Cited

U.S. PATENT DOCUMENTS 4,827,548 A * 5/1989 Hood .................... A61G 3/061 14/71.1
4,900,217 A 2/1990 Nelson
4,923,360 A 5/1990 Beauchemin
5,244,335 A 9/1993 Johns
5,273,335 A 12/1993 Belnap et al.
5,305,486 A 4/1994 Smith et al.
5,380,144 A * 1/1995 Smith .................... A61G 3/061 14/71.3
5,393,192 A 2/1995 Hall et al.
5,676,515 A 10/1997 Haustein
5,775,232 A 7/1998 Golemis et al.
5,795,125 A 8/1998 Walkden
5,803,523 A 9/1998 Clark et al.
5,816,767 A 10/1998 Mann
5,832,555 A 11/1998 Saucier et al.
6,186,733 B1 2/2001 Lewis
6,190,112 B1 2/2001 Danilovic
6,409,458 B1 6/2002 Cohn et al.
6,431,815 B1 8/2002 Zarzecki et al.
6,484,344 B1 11/2002 Cooper
6,802,095 B1 10/2004 Whitmarsh et al.
7,010,825 B1 3/2006 Finch Salas
7,451,512 B2 * 11/2008 Fullerton ................ B60P 1/431 14/72.5
7,488,025 B1 2/2009 Roberson
7,913,343 B1 3/2011 Cohn
8,122,553 B1 2/2012 Johnson et al.
8,327,485 B1 12/2012 Morris et al.
8,438,683 B1 5/2013 Morris et al.
8,533,884 B1 9/2013 Johnson et al.
8,631,528 B1 1/2014 Johnson
8,926,254 B2 1/2015 Pocobello et al.
9,545,345 B1 1/2017 Akers, Jr.
9,719,261 B2 8/2017 Belman
9,764,674 B2 9/2017 Friesen et al.
9,902,306 B1 2/2018 Foss
9,994,263 B1 6/2018 Richter
10,040,385 B2 8/2018 Stevens et al.
12,336,939 B2 6/2025 Lee et al.
2001/0005478 A1 6/2001 Lewis
2004/0013507 A1 1/2004 Kiser
2004/0107520 A1 6/2004 Van Der Heiden
2004/0226116 A1 11/2004 O'Donnell et al.
2005/0215371 A1 9/2005 Navarro
2006/0288501 A1 12/2006 Thygesen
2007/0261181 A1 11/2007 Willard
2008/0042464 A1 2/2008 Hutchins, Jr.
2008/0106058 A1 5/2008 Demick
2008/0184500 A1 8/2008 Bettcher
2009/0108614 A1 * 4/2009 Washington ............ B60P 1/435 296/61
2009/0274542 A1 11/2009 Pocobello et al.
2010/0332085 A1 12/2010 Song et al.
2011/0027054 A1 2/2011 Hansen
2011/0135432 A1 6/2011 Budd et al.
2012/0233787 A1 9/2012 Couto et al.
2014/0044512 A1 2/2014 Couto et al.
2015/0052693 A1 * 2/2015 Allen .................... B65G 69/28 14/71.1
2018/0105091 A1 4/2018 Stevens et al.
2019/0106042 A1 4/2019 Hill et al.
2021/0000666 A1 1/2021 Smith et al.
2021/0361499 A1 11/2021 Pujol Oller et al.
2023/0257032 A1 8/2023 Harmon et al.
2024/0075864 A1 3/2024 Van Wiemeersch et al.
2024/0116424 A1 4/2024 Smith et al.

FOREIGN PATENT DOCUMENTS

CN 219192055 U 6/2023
EP 3156026 A2 4/2017
GB 2415179 A 12/2005
GB 2415680 A 1/2006
KR 101157563 B1 6/2012
KR 102422681 B1 7/2022
WO 9626848 A1 9/1996
WO 0020252 A1 4/2000
WO WO-02079018 A1 * 10/2002 .............. B60P 1/431
WO 03064208 A1 8/2003

* cited by examiner

RAMP APPARATUS FOR VEHICLE

CROSS-REFERENCE TO RELATED APPLICATIONS

This application claims the benefit of Korean Patent Application No. 10-2023-0011815, filed on Jan. 30, 2023, which application is hereby incorporated herein by reference.

TECHNICAL FIELD

The present disclosure relates to a ramp apparatus for a vehicle.

BACKGROUND

Vehicles such as buses or wheelchair accessible vehicles or mobility vans for handicapped people may include a ramp apparatus that assists in boarding or unboarding of people in wheelchairs. The ramp apparatus may have a ramp platform stowed on a floor of a vehicle body, and the ramp platform may be manually or automatically deployed by a user from the vehicle body to the ground. The deployed ramp platform may be inclined at a predetermined angle with respect to the ground.

Due to the slope (inclination) of the ramp platform, it may be difficult to apply the ramp apparatus to general passenger vehicles with a high step-in height, except for low floor buses/non-step buses.

Meanwhile, wheelchair accessible vehicles or mobility vans for handicapped people may be designed as follows: remove a portion of a rear chassis from a vehicle body; lower a rear floor; cut off a portion of a rear bumper to modify a rear portion of the vehicle body; and mount a ramp apparatus on the modified rear portion.

However, the existing ramp apparatus cannot increase a deployment length of the ramp platform due to the lack of storage space (stowage) on the rear floor, which makes it difficult to reduce the slope of the ramp platform. In particular, the deployment length of the ramp platform may be relatively short, which makes it difficult to meet a legal standard for slope (for example, 14°).

Some ramp apparatuses may be designed to allow a plurality of ramp platforms to be extended from the vehicle body to the ground so that the ramp platforms may meet the legal standard for slope. However, a system of operating the plurality of ramp platforms may be very complex, so a deployment speed thereof may be excessively slow. It may be difficult to use them for various purposes, causing an inconvenience in use.

The above information described in this background section is provided to assist in understanding the background of the inventive concept and may include any technical concept which is not considered as the prior art that is already known to those skilled in the art.

SUMMARY

The present disclosure relates to a ramp apparatus for a vehicle. Particular embodiments relate to a ramp apparatus for a vehicle designed to move telescopically from a vehicle body to the ground or vice versa.

Embodiments of the present disclosure can solve problems occurring in the prior art while advantages achieved by the prior art are maintained intact.

An embodiment of the present disclosure provides a ramp apparatus for a vehicle designed to move telescopically from a vehicle body to the ground or vice versa.

According to an embodiment of the present disclosure, a ramp apparatus for a vehicle may include a housing mounted on a vehicle body, a ramp assembly configured to move between a stowed position in which the ramp assembly is stowed in a cavity of the housing and a deployed position in which the ramp assembly is deployed or extended from the cavity of the housing and including one or more ramp platforms telescopically connected to each other, and a front cover configured to bridge between a leading end portion of the housing and a trailing end portion of the ramp assembly when the ramp assembly is in the deployed position.

The front cover may be pivotally mounted on the housing.

The housing may include a front upper panel provided on a top end of the leading end portion thereof, and the front cover may be pivotally mounted on the front upper panel through a hinge shaft and a hinge bracket.

The front upper panel may have a mounting recess, and the hinge bracket may be mounted in the mounting recess.

The hinge bracket may have a slot extending in a longitudinal direction of the housing, and an end portion of the hinge shaft may be movably received in the slot of the hinge bracket.

The slot may include a straight portion extending straightly along the longitudinal direction of the housing and an inclined portion extending upwardly and obliquely from the straight portion. The inclined portion may be located in front of the straight portion.

The hinge shaft may be connected to the front cover through a hinge link.

The hinge link may include an upper portion and a lower portion obliquely connected to the upper portion at a predetermined angle. The upper portion may be connected to the hinge shaft, and the lower portion may be connected to the front cover.

The front cover may have a hinge lug protruding toward the housing, and the lower portion of the hinge link may be connected to the hinge lug through a mounting bolt.

The hinge shaft may be configured to move between a retracted position in which the end portion of the hinge shaft comes into contact with a rear end of the straight portion of the slot and an advanced position in which the end portion of the hinge shaft comes into contact with a top end of the inclined portion of the slot.

The ramp apparatus may further include a spring member elastically connecting the hinge shaft and the hinge bracket, and the spring member may allow the hinge shaft to be biased toward the retracted position.

The ramp assembly may include a first ramp platform telescopically moving with respect to the housing, a second ramp platform telescopically moving with respect to the first ramp platform, and a third ramp platform telescopically moving with respect to the second ramp platform.

The ramp apparatus may further include a hinge mechanism configured to move the first ramp platform between the stowed position and the deployed position and to allow the first ramp platform to pivot with respect to the housing when the first ramp platform is in the deployed position.

The hinge mechanism may include a moving body connected to the first ramp platform through a hinge shaft, a hinge drive unit mounted on the moving body, and a moving mechanism allowing the moving body to move.

The ramp apparatus may further include a drive mechanism configured to move the second ramp platform and the third ramp platform.

The drive mechanism may include a drive sprocket rotatably mounted on the second ramp platform, a driven sprocket rotatably mounted on the second ramp platform and spaced apart from the drive sprocket, a chain connecting the drive sprocket and the driven sprocket, and a motor driving the drive sprocket. The drive mechanism may be configured to move the second ramp platform with respect to the first ramp platform by the rotation of the drive sprocket and to move the third ramp platform with respect to the second ramp platform by the rotation of the driven sprocket.

The drive mechanism may further include a first pinion coupled to the drive sprocket and a first rack gear mounted on the first ramp platform and meshing with the first pinion.

The drive mechanism may further include a second pinion coupled to the driven sprocket and a second rack gear mounted on the third ramp platform and meshing with the second pinion.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
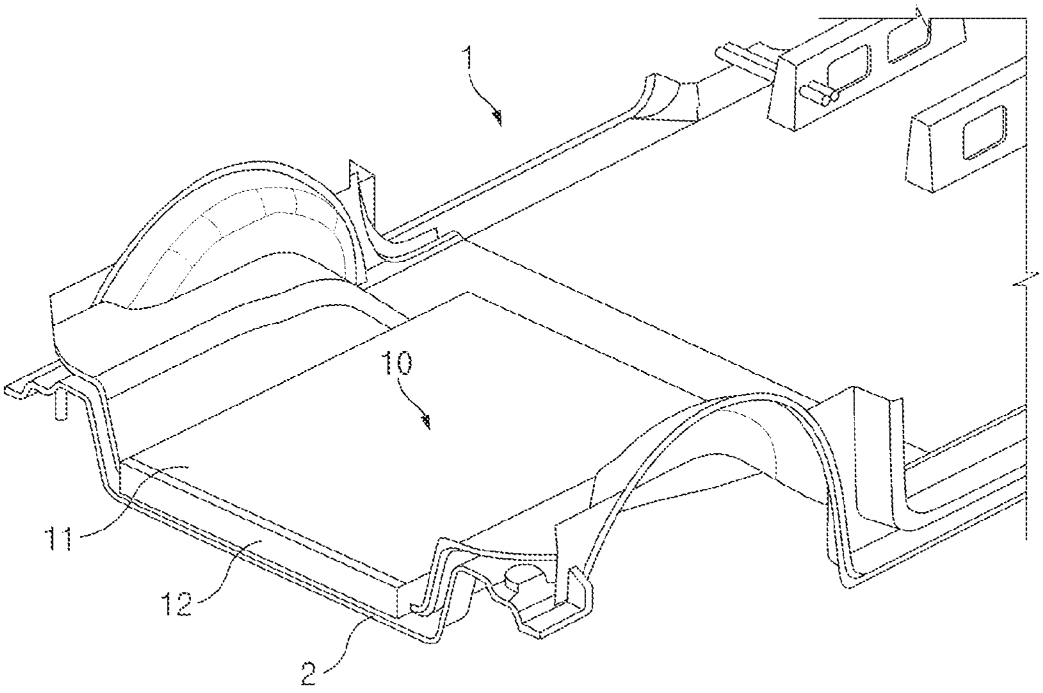
FIG. 1 illustrates a perspective view of a ramp apparatus for a vehicle according to an exemplary embodiment of the present disclosure, which is mounted on a rear floor of a vehicle body, in a state in which a ramp assembly is fully stowed in a housing.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A ramp apparatus 10 for a vehicle according to an exemplary embodiment of the present disclosure may be applied to various vehicles and may be disposed on a floor of a vehicle body. The ramp apparatus 10 may be designed to be deployed (extended out) from the floor of the vehicle body to the ground.

Referring to FIG. 1, the ramp apparatus 10 for a vehicle according to an exemplary embodiment of the present disclosure may be disposed on a rear floor 2 of a vehicle body 1. The ramp apparatus 10 for a vehicle may include a housing 11 fixedly mounted on the rear floor 2 of the vehicle body 1.

The housing 11 may have a trailing end portion facing the interior of the vehicle and a leading end portion facing the exterior of the vehicle, and the trailing end portion and the leading end portion may oppose each other. When the housing 11 is mounted on the rear floor 2, the leading end portion of the housing 11 may face the exterior of the vehicle, and the trailing end portion of the housing 11 may face the interior of the vehicle.

Figure 6:
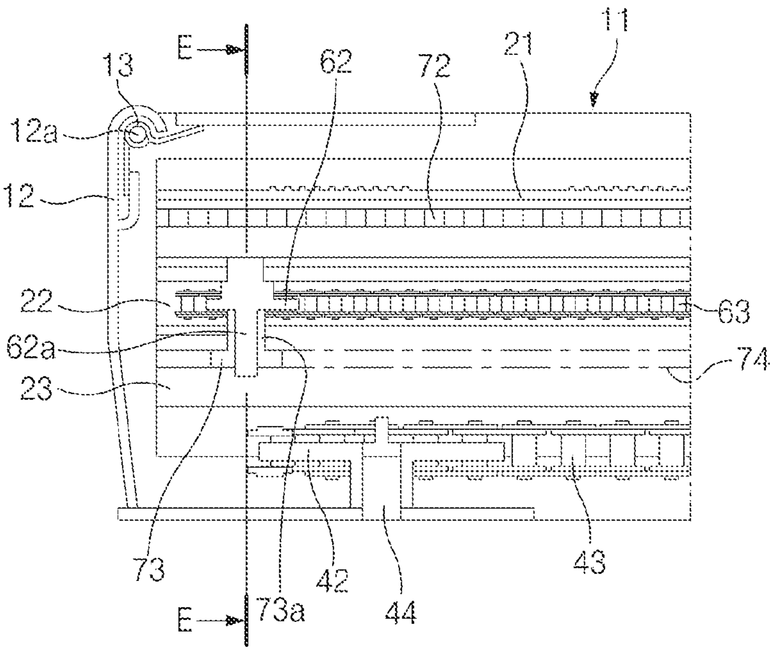
FIG. 6 illustrates an enlarged view of portion C of FIG. 4.

The housing 11 may have a cavity defined therein. The housing 11 may have a leading opening provided in the leading end portion thereof, and the housing 11 may be open to the exterior of the vehicle through the leading opening. Referring to FIG. 6, the housing 11 may include a front cover 12 pivotally connected to the leading opening through a pivot pin 12*a*, and the front cover 12 may move between an open position and a closed position. The front cover 12 may be biased toward the closed position by a biasing member 13 such as a torsion spring.

Figure 2:
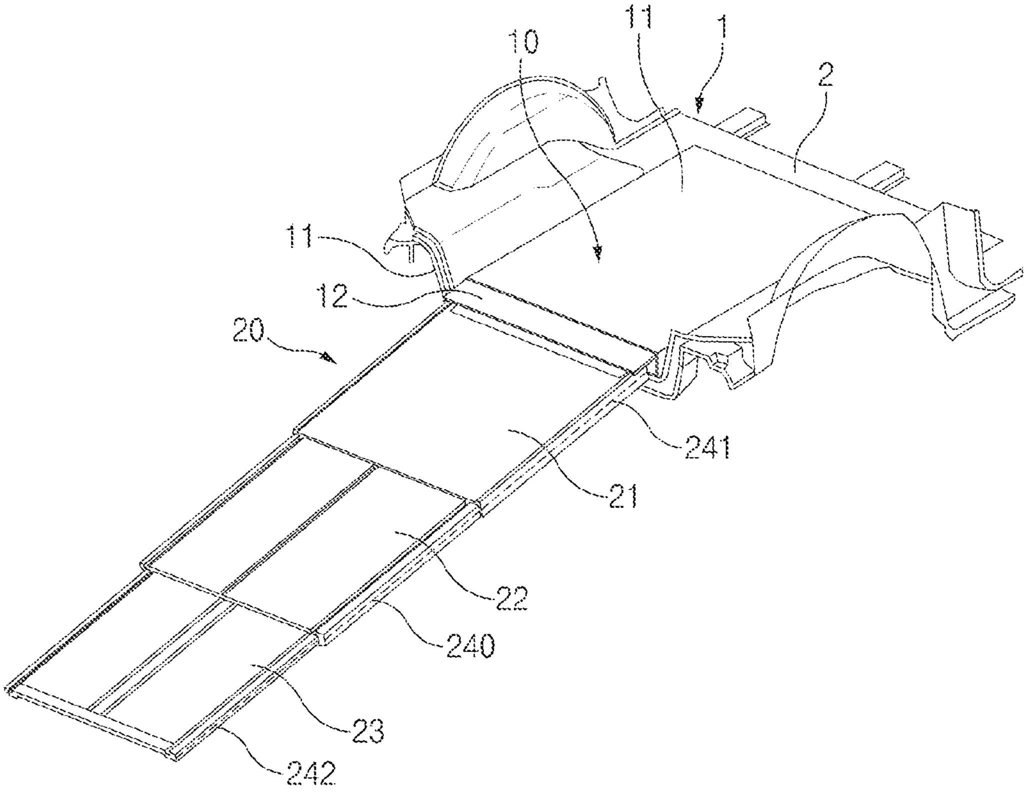
FIG. 2 illustrates a perspective view of a ramp apparatus for a vehicle according to an exemplary embodiment of the present disclosure, which is mounted on a rear floor of a vehicle body, in a state in which a ramp assembly is fully deployed/extended from a housing.
Figure 3:
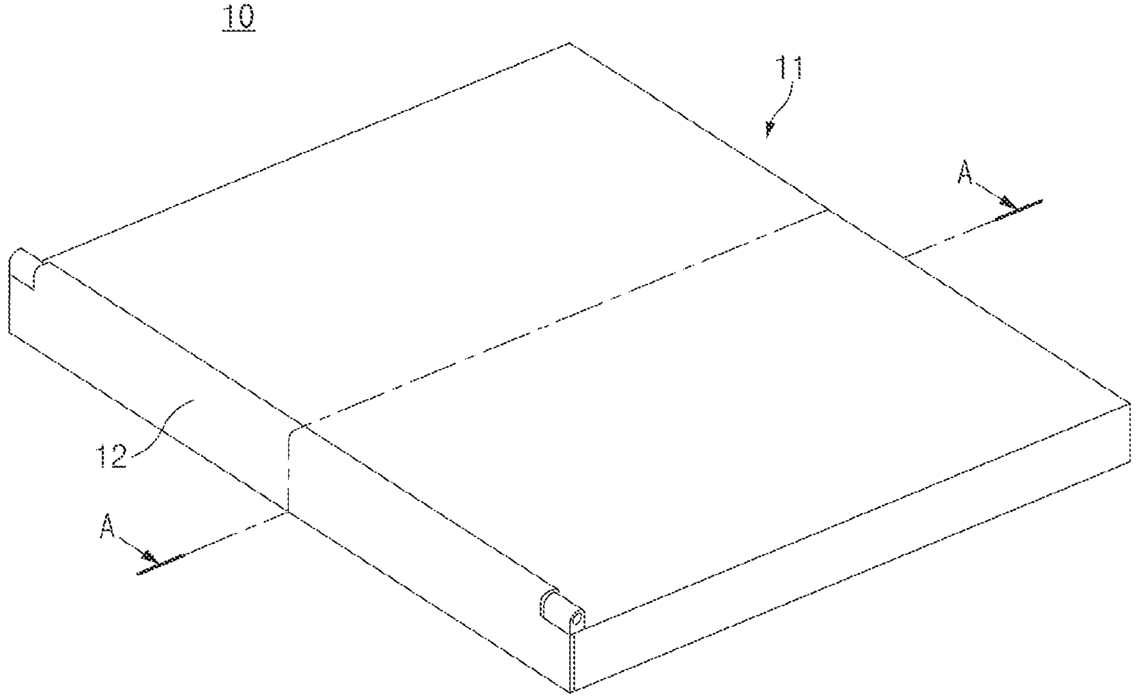
FIG. 3 illustrates a perspective view of a ramp apparatus for a vehicle according to an exemplary embodiment of the present disclosure, in a state in which a ramp assembly is stowed in a cavity of a housing.
Figure 9:
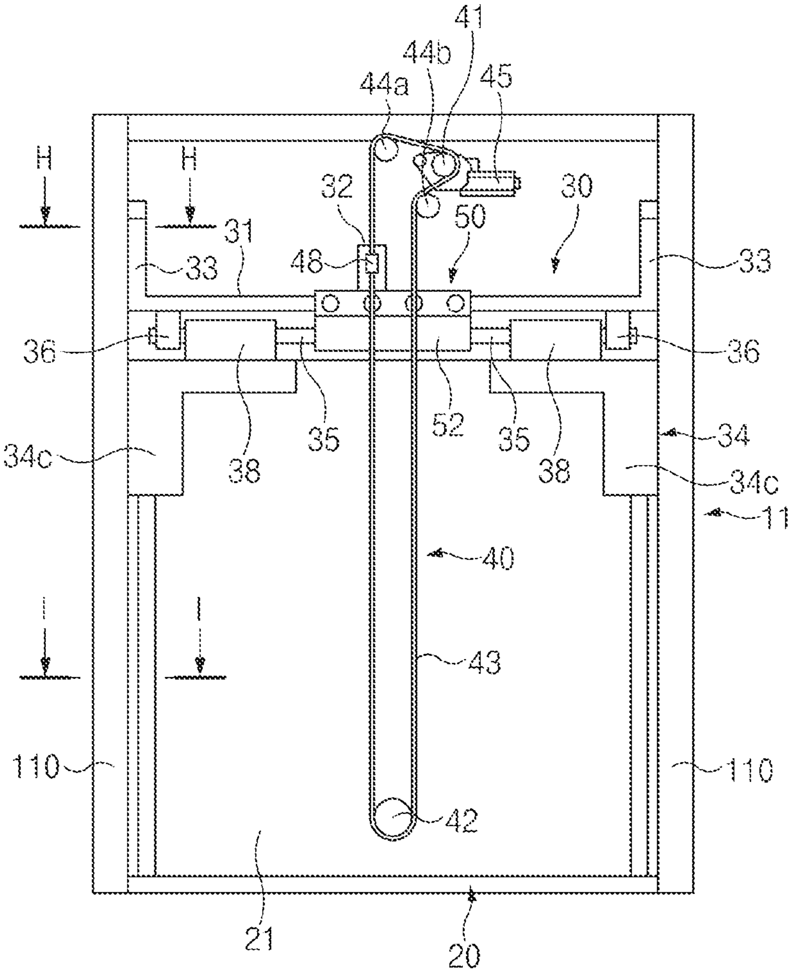
FIG. 9 illustrates a state in which the ramp assembly is stowed in the housing (as viewed in a direction indicated by arrow F of FIG. 4), from which a bottom wall of the housing is removed.
Figure 10:
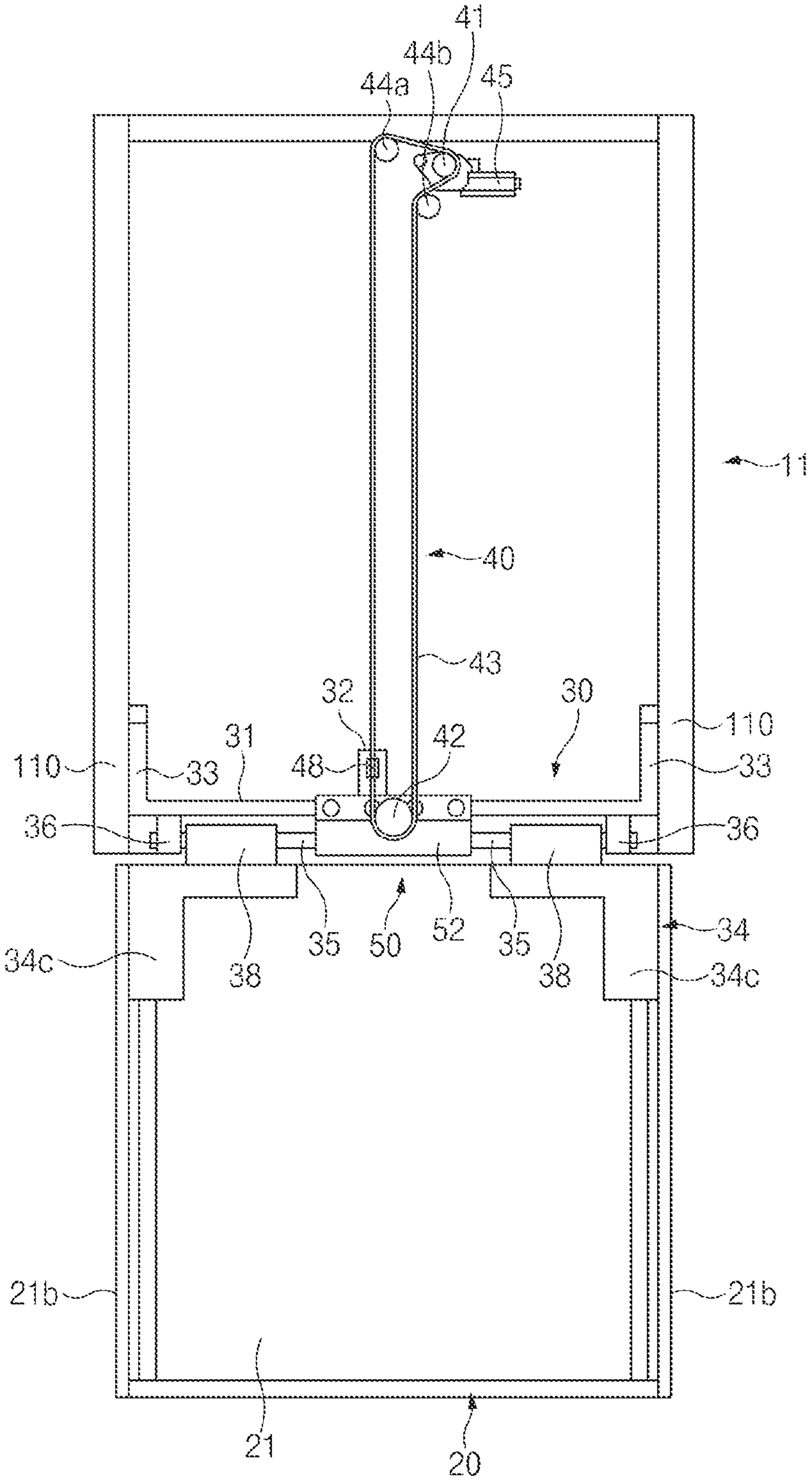
FIG. 10 illustrates a state in which the ramp assembly is deployed from the housing (as viewed in the direction indicated by arrow F of FIG. 4), from which the bottom wall of the housing is removed.

Referring to FIG. 2, the ramp apparatus 10 for a vehicle according to an exemplary embodiment of the present disclosure may include a ramp assembly 20 that is movable with respect to the housing 11. The ramp assembly 20 may be configured to move between a stowed position (see FIG. 9) and a deployed position (see FIG. 10) by a hinge mechanism 30. Referring to FIG. 9, the stowed position refers to a position in which the ramp assembly 20 is stowed in an internal space of the housing 11. Referring to FIG. 10, the deployed position refers to a position in which the ramp assembly 20 is deployed from the housing 11.

Figure 4:
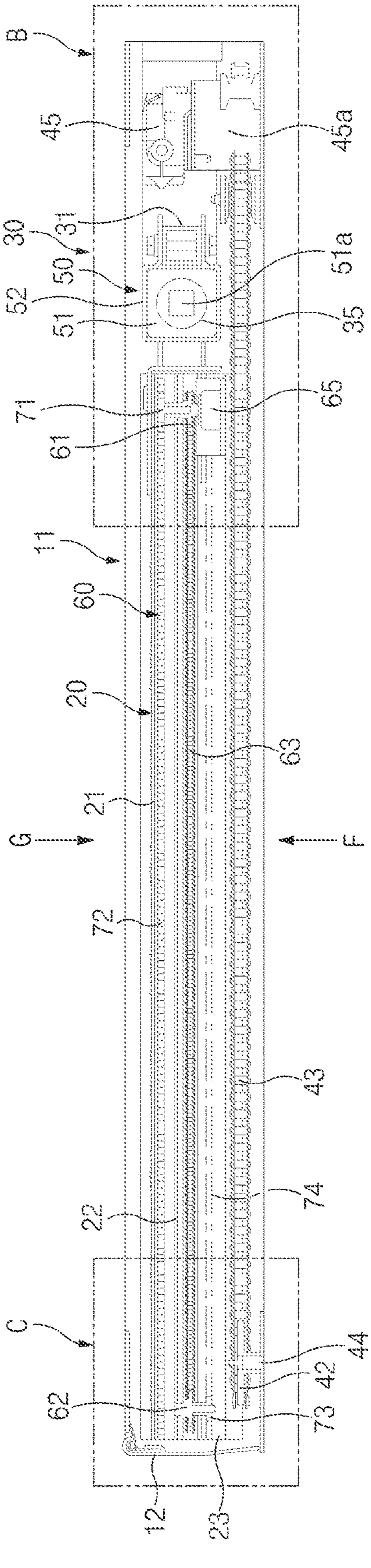
FIG. 4 illustrates a longitudinal cross-sectional view, taken along line A-A of FIG. 3.

Referring to FIG. 4, the ramp assembly 20 may include a plurality of ramp platforms 21, 22, and 23 telescopically connected to each other. Specifically, the plurality of ramp platforms 21, 22, and 23 may include a first ramp platform 21 telescopically and pivotally connected to the housing 11, a second ramp platform 22 telescopically connected to the first ramp platform 21, and a third ramp platform 23 telescopically connected to the second ramp platform 22.

The first ramp platform 21 may include a trailing end portion facing the interior of the vehicle and a leading end portion facing the exterior of the vehicle. The first ramp platform 21 may have a leading opening provided in the leading end portion thereof and a trailing opening provided in the trailing end portion thereof. The first ramp platform 21 may have a cavity defined therein, and the second ramp platform 22 may be stowed in the cavity of the first ramp platform 21. The first ramp platform 21 may be movable between a stowed position in which the first ramp platform 21 is stowed in the cavity of the housing 11 and a deployed position in which the first ramp platform 21 is deployed from the housing 11. When the first ramp platform 21 is in the stowed position, the trailing end portion of the first ramp platform 21 may be close to the trailing end portion of the housing 11, and the leading end portion of the first ramp platform 21 may be close to the leading end portion of the housing 11. When the first ramp platform 21 is in the deployed position, the trailing end portion of the first ramp platform 21 may be close to the leading end portion of the housing 11, and the leading end portion of the first ramp platform 21 may be far from the leading end portion of the housing 11.

The second ramp platform 22 may include a trailing end portion facing the interior of the vehicle and a leading end portion facing the exterior of the vehicle. The second ramp platform 22 may have a leading opening provided in the leading end portion thereof and a trailing opening provided in the trailing end portion thereof. The second ramp platform 22 may have a cavity defined therein, and the third ramp platform 23 may be stowed in the cavity of the second ramp platform 22. The second ramp platform 22 may be movable between a stowed position in which the second ramp platform 22 is stowed in the cavity of the first ramp platform 21 and an extended position in which the second ramp platform 22 is extended out from the first ramp platform 21. When the second ramp platform 22 is in the stowed position, the trailing end portion of the second ramp platform 22 may be close to the trailing end portion of the first ramp platform 21, and the leading end portion of the second ramp platform 22 may be close to the leading end portion of the first ramp platform 21. When the second ramp platform 22 is in the extended position, the trailing end portion of the second ramp platform 22 may be close to the leading end portion of the first ramp platform 21, and the leading end portion of the second ramp platform 22 may be far from the leading end portion of the first ramp platform 21.

The third ramp platform 23 may include a trailing end portion facing the interior of the vehicle and a leading end portion facing the exterior of the vehicle. The third ramp platform 23 may have a leading opening provided in the leading end portion thereof and a trailing opening provided in the trailing end portion thereof. The third ramp platform 23 may have a cavity defined therein. The third ramp platform 23 may be movable between a stowed position in which the third ramp platform 23 is stowed in the cavity of the second ramp platform 22 and an extended position in which the third ramp platform 23 is extended out from the second ramp platform 22. When the third ramp platform 23 is in the stowed position, the trailing end portion of the third ramp platform 23 may be close to the trailing end portion of the second ramp platform 22, and the leading end portion of the third ramp platform 23 may be close to the leading end portion of the second ramp platform 22. When the third ramp platform 23 is in the extended position, the trailing end portion of the third ramp platform 23 may be close to the leading end portion of the second ramp platform 22, and the leading end portion of the third ramp platform 23 may be far from the leading end portion of the second ramp platform 22.

Figure 22:
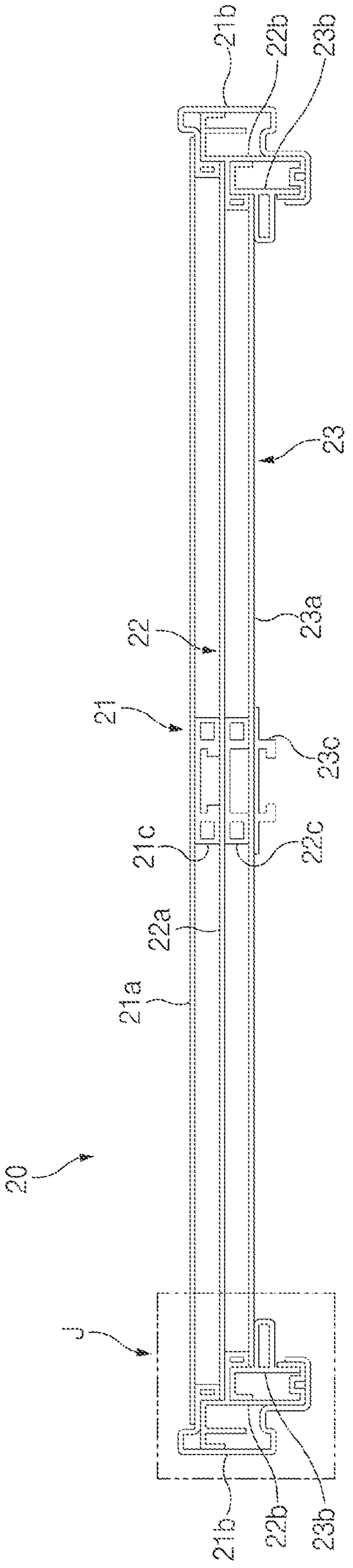
FIG. 22 illustrates a transverse cross-section view of a ramp assembly in a ramp apparatus for a vehicle according to an exemplary embodiment of the present disclosure.

Referring to FIG. 22, each of the first ramp platform 21, the second ramp platform 22, and the third ramp platform 23 may be an aluminum extruded product. Each of the first ramp platform 21, the second ramp platform 22, and the third ramp platform 23 may have the cavity defined therein. In particular, the first ramp platform 21 may have the largest size, and the size of the second ramp platform 22 may be less than the size of the first ramp platform 21. Specifically, the length, width, and thickness of the first ramp platform 21 may be greater than the length, width, and thickness of the second ramp platform 22, and the second ramp platform 22 may be fully stowed in the first ramp platform 21. The size of the third ramp platform 23 may be less than the size of the second ramp platform 22. Specifically, the length, width, and thickness of the second ramp platform 22 may be greater than the length, width, and thickness of the third ramp platform 23, and the third ramp platform 23 may be fully stowed in the second ramp platform 22.

Figure 21:
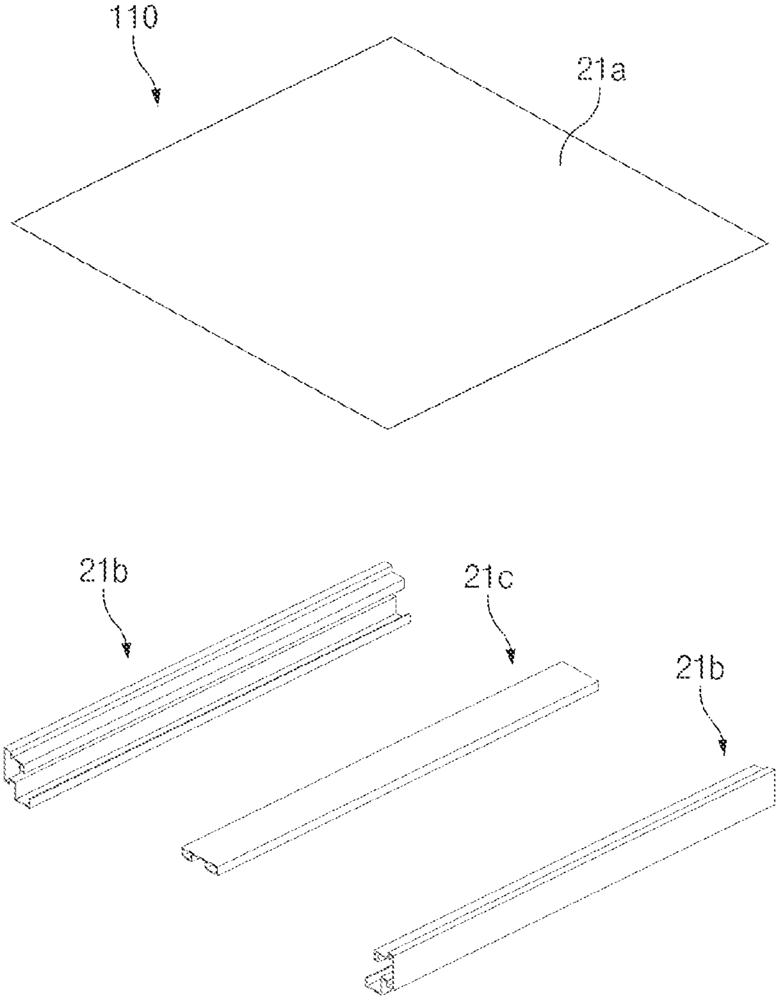
FIG. 21 illustrates an exploded perspective view of a first ramp platform in a ramp apparatus for a vehicle according to an exemplary embodiment of the present disclosure.

Referring to FIGS. 21 and 22, the first ramp platform 21 may include a first ramp plate 21*a*, a pair of first side rails 21*b* attached to both side edges of the first ramp plate 21*a*, respectively, and a first mounting portion 21*c* attached to a central portion of the first ramp plate 21*a*.

The first ramp plate 21*a* may be made of a metal material such as aluminum or steel. The first ramp plate 21*a* may be formed into a flat plate by cutting and/or the like. As the first ramp plate 21*a* is formed into a flat plate, various patterns such as unevenness or irregularities may be easily machined on a top surface of the first ramp plate 21*a*.

The first side rails 21*b* may extend along the corresponding side edges of the first ramp plate 21*a*, respectively. The first side rails 21*b* may be fixed to the corresponding side edges of the first ramp plate 21*a* using fasteners, welding, and/or the like, respectively.

Figure 23:
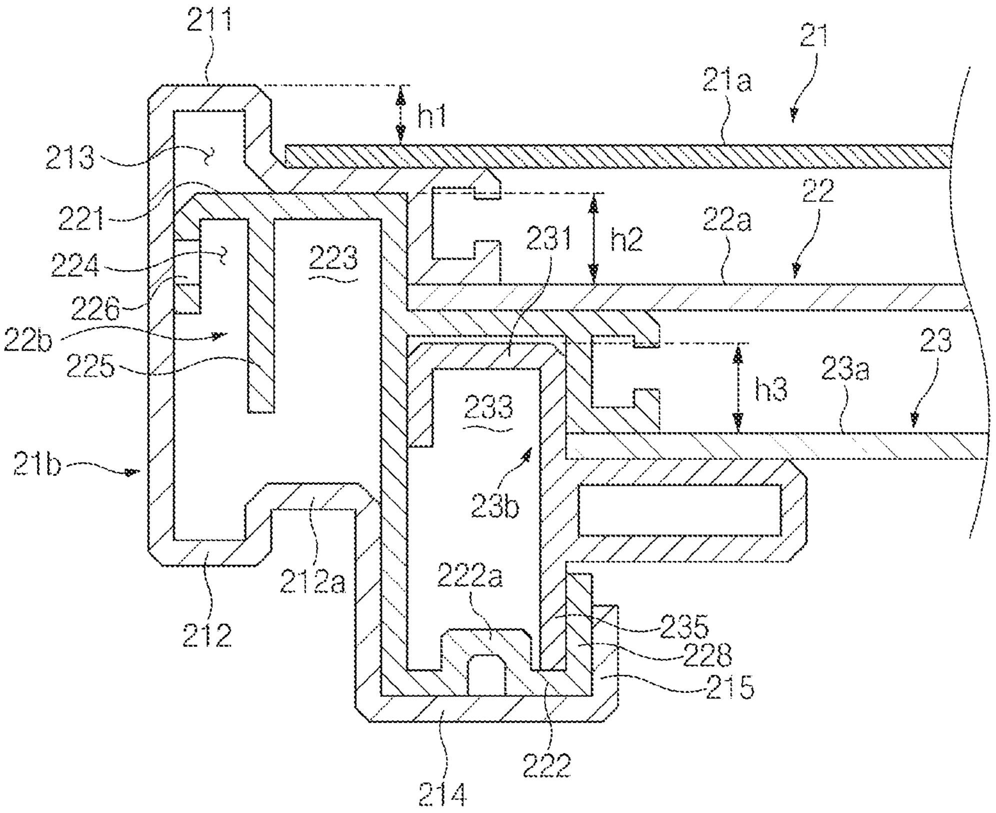
FIG. 23 illustrates an enlarged view of portion J of FIG. 22.

Each first side rail 21*b* may have a channel-shaped cross section that is open to the second ramp platform 22 and the third ramp platform 23. Referring to FIG. 23, each first side rail 21*b* may include an upper guide portion 211 protruding upwardly, a lower guide portion 212 protruding downwardly, an inner guide portion 214 connected to the lower guide portion 212, a contact portion 212*a* located between the lower guide portion 212 and the inner guide portion 214, and a vertical guide portion 215 connected to the inner guide portion 214. The inner guide portion 214 may be located lower than the lower guide portion 212, and the contact portion 212*a* may be located higher than the lower guide portion 212. The upper guide portion 211, the lower guide portion 212, the inner guide portion 214, the contact portion 212*a*, and the vertical guide portion 215 may define a cavity 213.

Figure 7:
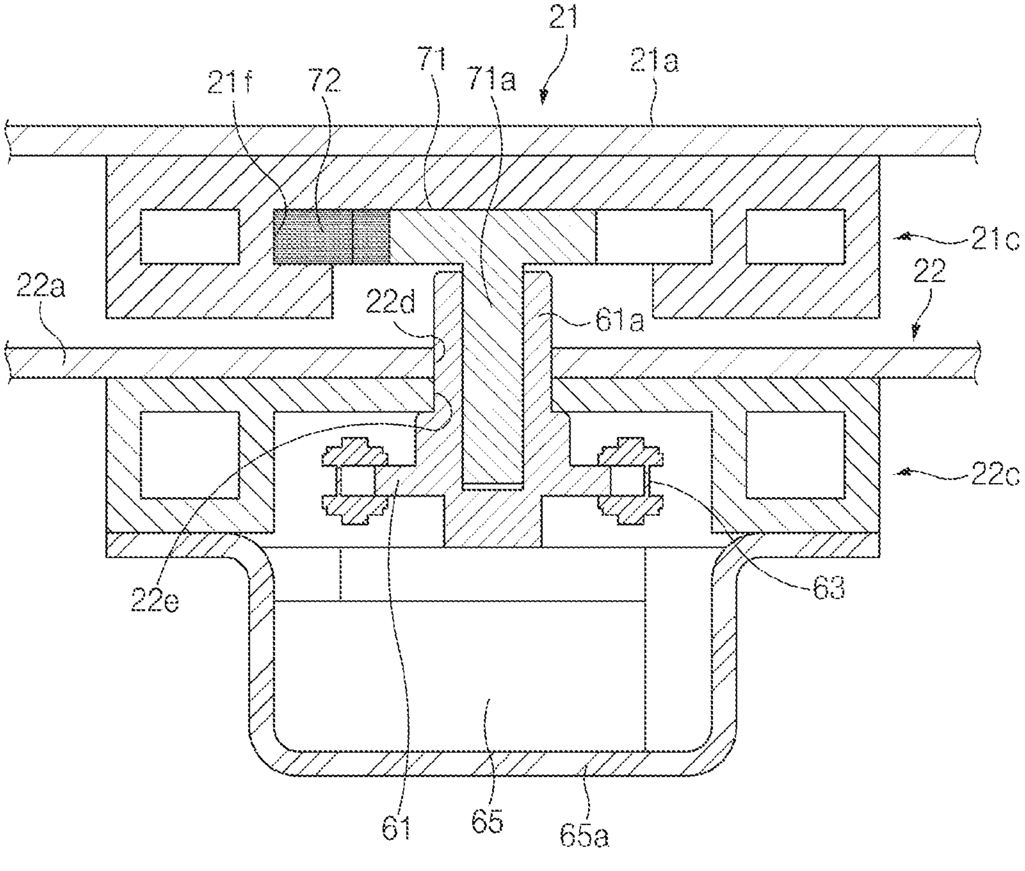
FIG. 7 illustrates a cross-sectional view, taken along line D-D of FIG. 5.

Referring to FIGS. 7 and 22, the first mounting portion 21*c* may extend along a central longitudinal axis of the first ramp plate 21*a*, and the first mounting portion 21*c* may be fixed to the central portion of the first ramp plate 21*a*. The first mounting portion 21*c* may have a U-shaped cross section that is open to the second ramp platform 22, and accordingly the first mounting portion 21*c* may have a cavity defined therein. The first mounting portion 21*c* may be made of a metal material such as aluminum, and the first mounting portion 21*c* may be formed by an extrusion process and/or the like.

The first ramp plate 21*a*, the pair of first side rails 21*b*, and the first mounting portion 21*c* may be individually made, and the pair of first side rails 21*b* and the first mounting portion 21*c* may be fixed to the first ramp plate 21*a* using fasteners, welding, and/or the like so that the first ramp platform 21 may be formed of various modular structures. For example, the width of the first ramp plate 21*a* may be varied depending on the specifications of the vehicle so that the first ramp platform 21 may be embodied as various modular structures without changing the structure of a drive mechanism 60.

Referring to FIG. 22, the second ramp platform 22 may include a second ramp plate 22*a*, a pair of second side rails 22*b* attached to both side edges of the second ramp plate 22*a*, respectively, and a second mounting portion 22*c* attached to a central portion of the second ramp plate 22*a*.

The second ramp plate 22*a* may be made of a metal material such as aluminum or steel. The second ramp plate 22*a* may be formed into a flat plate by cutting and/or the like. As the second ramp plate 22*a* is formed into a flat plate, various patterns such as unevenness or irregularities may be easily machined on a top surface of the second ramp plate 22*a*.

The second side rails 22*b* may extend along the corresponding side edges of the second ramp plate 22*a*, respectively. The second side rails 21*b* may be fixed to the corresponding side edges of the second ramp plate 22*a* using fasteners, welding, and/or the like, respectively.

Each second side rail 22*b* may have a channel-shaped cross section that is open to the third ramp platform 23. Each second side rail 22*b* may slide along the corresponding first side rail 21*b*. Referring to FIG. 23, each second side rail 22*b* may include an upper guide portion 221 protruding upwardly, an inner guide portion 222 connected to the upper guide portion 221, a contact portion 222*a* protruding from the inner guide portion 222, and a vertical guide portion 228 connected to the inner guide portion 222. Each second side rail 22*b* may include an inner cavity 223 and an outer cavity 224 located below the upper guide portion 221, and the inner cavity 223 and the outer cavity 224 may be partially partitioned by a vertical partition 225. The inner guide portion 222 may be located lower than the upper guide portion 221, and the contact portion 222*a* may protrude upwardly from the inner guide portion 222. The vertical guide portion 228 of the second side rail 22*b* may be guided with respect to the vertical guide portion 215 of the first side rail 21*b*.

Figure 8:
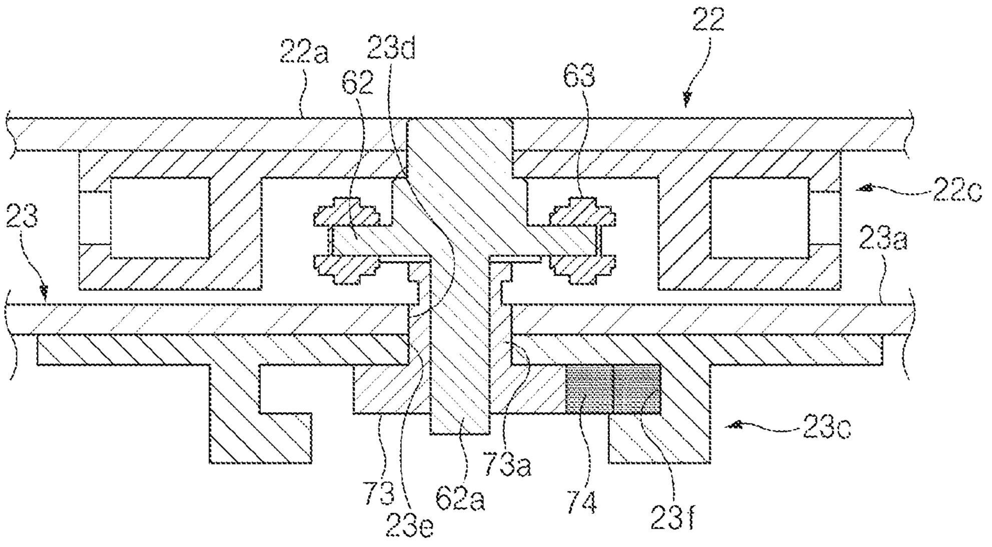
FIG. 8 illustrates a cross-sectional view, taken along line E-E of FIG. 6.

Referring to FIGS. 7, 8, and 22, the second mounting portion 22*c* may extend along a central longitudinal axis of the second ramp plate 22*a*, and the second mounting portion 22*c* may be fixed to the central portion of the second ramp plate 22*a*. The second mounting portion 22*c* may have a U-shaped cross section that is open to the third ramp platform 23, and accordingly the second mounting portion 22*c* may have a cavity defined therein. The second mounting portion 22*c* may be made of a metal material such as aluminum, and the second mounting portion 22*c* may be formed by an extrusion process and/or the like.

The second ramp plate 22*a*, the pair of second side rails 22*b*, and the second mounting portion 22*c* may be individually made, and the pair of second side rails 22*b* and the second mounting portion 22*c* may be fixed to the second ramp plate 22*a* using fasteners, welding, and/or the like so that the second ramp platform 22 may be formed of various modular structures. For example, the width of the second ramp plate 22*a* may be varied depending on the specifications of the vehicle so that the second ramp platform 22 may be embodied as various modular structures without changing the structure of the drive mechanism 60.

Referring to FIG. 22, the third ramp platform 23 may include a third ramp plate 23*a*, a pair of third side rails 23*b* attached to both side edges of the third ramp plate 23*a*, respectively, and a third mounting portion 23*c* attached to a central portion of the third ramp plate 23*a*.

The third ramp plate 23*a* may be made of a metal material such as aluminum or steel. The third ramp plate 23*a* may be formed into a flat plate by cutting and/or the like. As the third ramp plate 23*a* is formed into a flat plate, various patterns such as unevenness or irregularities may be easily machined on a top surface of the third ramp plate 23*a*.

The third side rails 23*b* may extend along the corresponding side edges of the third ramp plate 23*a*, respectively. The third side rails 23*b* may be fixed to the corresponding side edges of the third ramp plate 23*a* using fasteners, welding, and/or the like, respectively. Each third side rail 23*b* may slide along the corresponding second side rail 22*b*. Referring to FIG. 23, each third side rail 23*b* may include an upper guide portion 231 protruding upwardly and a vertical guide portion 235 connected to the upper guide portion 231. Each third side rail 23*b* may include a cavity 233 located below the upper guide portion 231. The vertical guide portion 235 of the third side rail 23*b* may be guided with respect to the vertical guide portion 228 of the second side rail 22*b*.

Referring to FIGS. 8 and 22, the third mounting portion 23*c* may extend along a central longitudinal axis of the third ramp plate 23*a*. The third mounting portion 23*c* may have a U-shaped cross section that is open downwardly, and accordingly the third mounting portion 23*c* may have a cavity defined therein. The third mounting portion 23*c* may be made of a metal material such as aluminum, and the third mounting portion 23*c* may be formed by an extrusion process and/or the like.

Referring to FIGS. 22 to 25, each first side rail 21*b* may have the channel-shaped cross section that is open to the second ramp platform 22 and the third ramp platform 23, and each second side rail 22*b* may have the channel-shaped cross section that is open to the third ramp platform 23 so that a foreign object may be prevented from being stuck between the first side rail 21*b* of the first ramp platform 21, the second side rail 22*b* of the second ramp platform 22, and the third side rail 23*b* of the third ramp platform 23.

Referring to FIGS. 22 to 25, the first ramp plate 21*a* of the first ramp platform 21 and the second ramp plate 22*a* of the second ramp platform 22 may be spaced apart from each other by a predetermined gap (for example, 15.5 mm), and the second ramp plate 22*a* of the second ramp platform 22 and the third ramp plate 23*a* of the third ramp platform 23 may be spaced apart from each other by a predetermined gap (for example, 15.5 mm). Accordingly, even when at least one of the first ramp plate 21*a*, the second ramp plate 22*a*, and the third ramp plate 23*a* is deformed, the deformation may not affect the movement of the first ramp platform 21, the movement of the second ramp platform 22, and the movement of the third ramp platform 23.

The ramp apparatus 10 for a vehicle according to an exemplary embodiment of the present disclosure may include the hinge mechanism 30 configured to move the first ramp platform 21 of the ramp assembly 20 between the stowed position and the deployed position and to allow the first ramp platform 21 of the ramp assembly 20 to pivot with respect to the housing 11 when the first ramp platform 21 of the ramp assembly 20 is in the deployed position.

Figure 5:
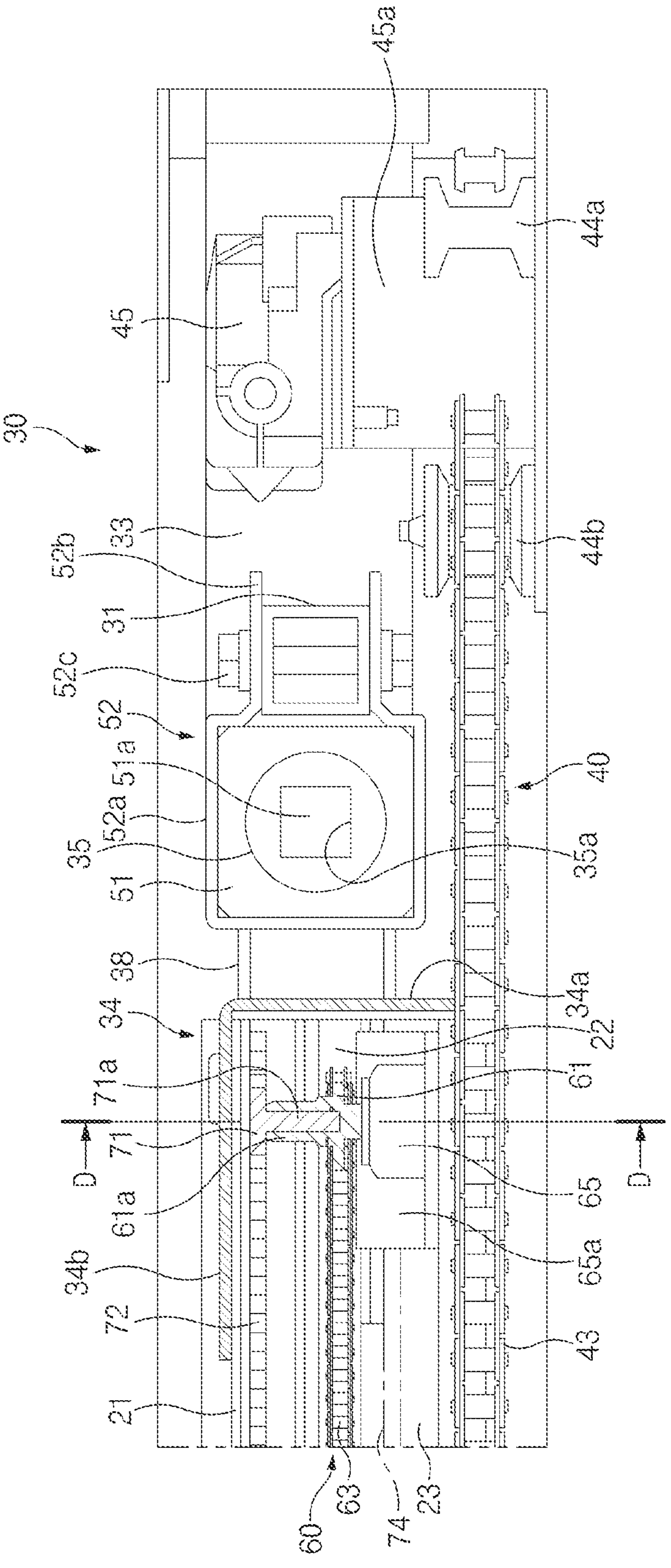
FIG. 5 illustrates an enlarged view of portion B of FIG. 4.

Referring to FIGS. 4 and 5, the hinge mechanism 30 may include a moving body 31 connected to the first ramp platform 21 of the ramp assembly 20 through a pair of hinge shafts 35 and a hinge drive unit 50 mounted on a central portion of the moving body 31.

Referring to FIGS. 9 and 10, the moving body 31 may extend along the width of the housing 11. The moving body 31 may include a central extension portion 32 extending from the central portion of the moving body 31 toward the trailing end portion of the housing 11 and a pair of side extension portions 33 extending from both ends of the moving body 31 toward the trailing end portion of the housing 11. The central extension portion 32 and each side extension portion 33 may extend along the length of the housing 11.

The moving body 31 may move along a longitudinal direction of the housing 11 in the internal space of the housing 11 by a moving mechanism 40. Referring to FIG. 9, when the moving body 31 moves close to the trailing end portion of the housing 11, the ramp assembly 20 may be fully stowed in the internal space of the housing 11. Referring to FIG. 10, when the moving body 31 moves close to the leading end portion of the housing 11, the ramp assembly 20 may be fully deployed (extended out) from the internal space of the housing 11.

Referring to FIGS. 9 and 10, the pair of side extension portions 33 of the moving body 31 may be guided along a pair of corresponding guide rails 110 so that the moving body 31 may move in the housing 11.

Figure 11:
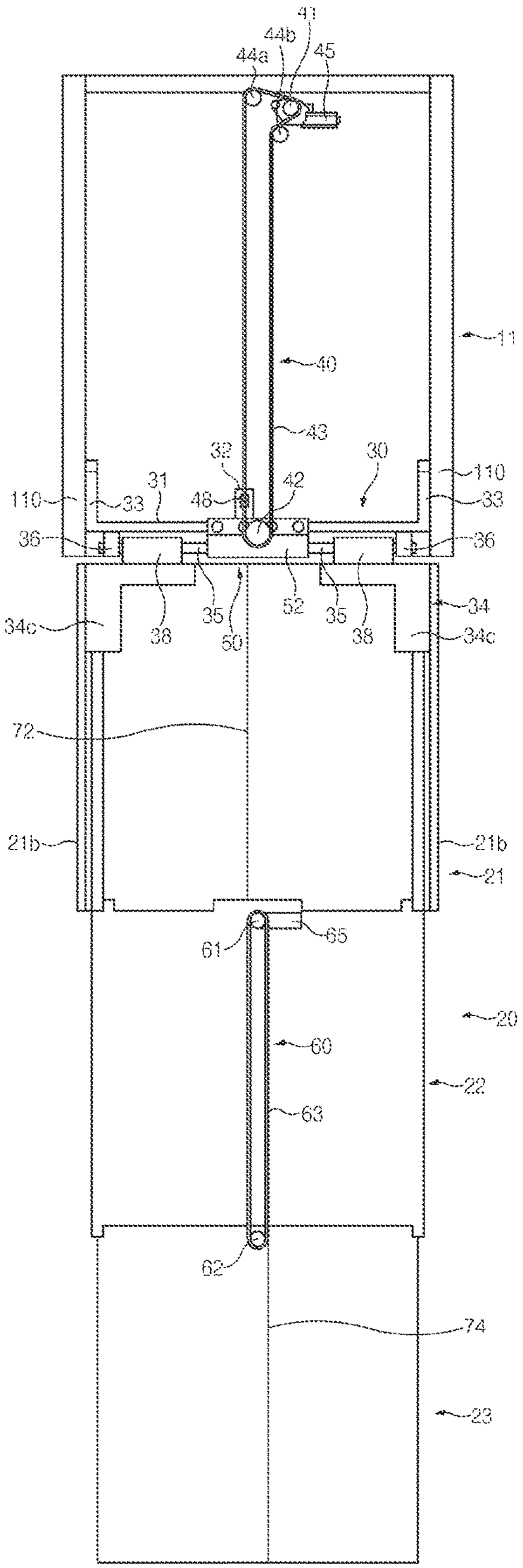
FIG. 11 illustrates a state in which a first ramp platform, a second ramp platform, and a third ramp platform of the ramp assembly are fully extended out from the housing (as viewed in the direction indicated by arrow F of FIG. 4), from which the bottom wall of the housing is removed.
Figure 12:
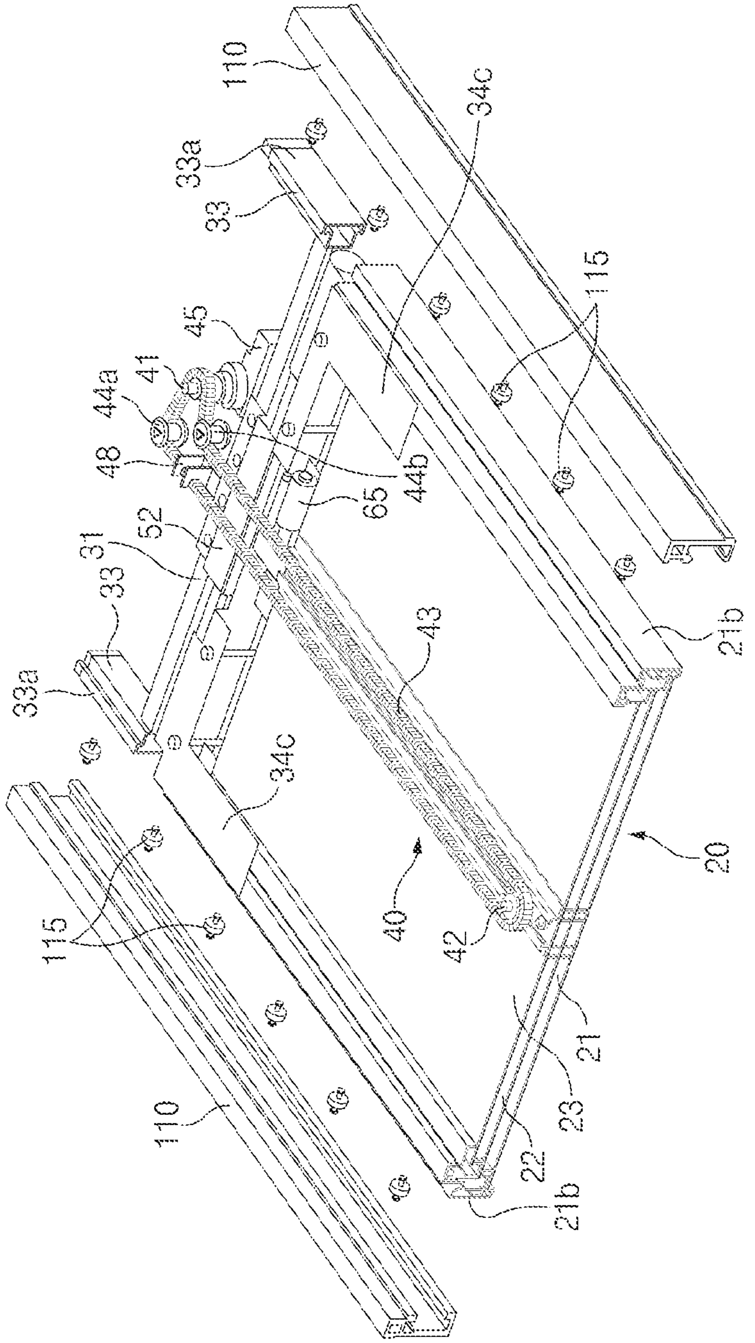
FIG. 12 illustrates an exploded perspective view of the ramp assembly, a hinge mechanism, and guide rails of the housing (as viewed in the direction indicated by arrow F of FIG. 4)

Referring to FIGS. 9, 10, and 11, the housing 11 may include the pair of guide rails 110 disposed on both sides thereof, and the pair of guide rails 110 may be spaced apart from each other in a width direction of the housing 11. The pair of guide rails 110 may be configured to guide the movement of the first ramp platform 21 of the ramp assembly 20 and the movement of the hinge mechanism 30.

Figure 13:
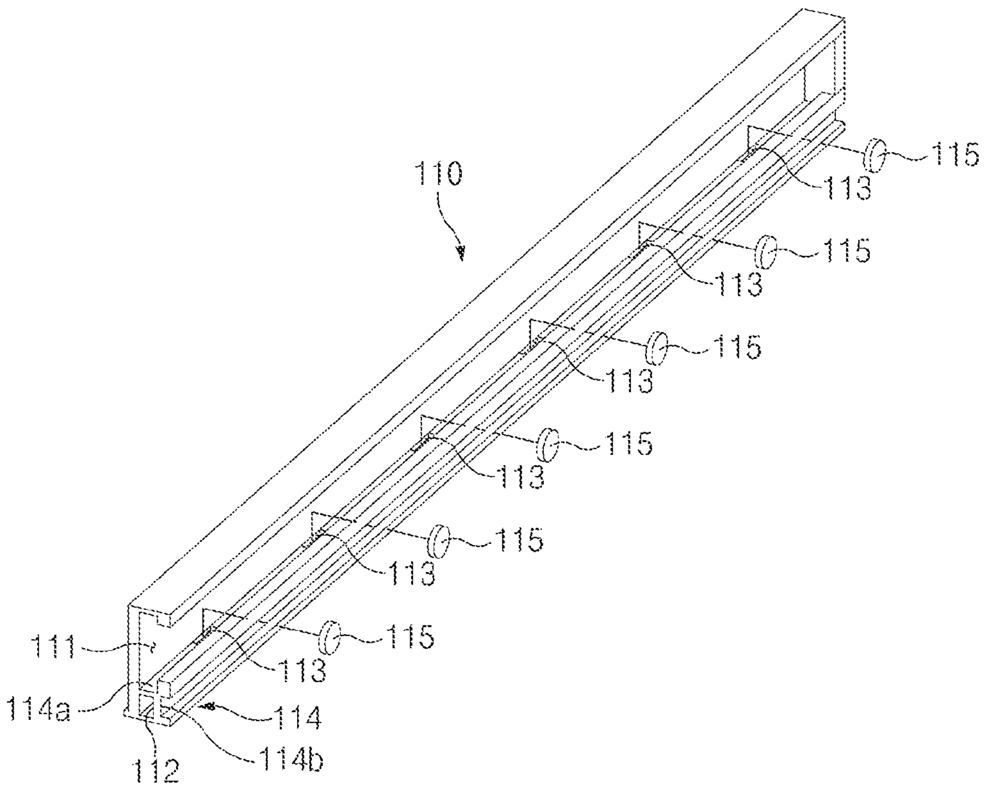
FIG. 13 illustrates a perspective view of the guide rails of the housing (as viewed in a direction indicated by arrow G of FIG. 4)

Referring to FIG. 13, each guide rail 110 may include a guide groove 111, a mounting portion 114 located below the guide groove 111, and a plurality of main rollers 115 rotatably mounted on the mounting portion 114. The guide groove 111 may extend along a longitudinal direction of the guide rail 110. The mounting portion 114 may be located below the guide groove 111, and the mounting portion 114 may extend along the longitudinal direction of the guide rail 110. According to an exemplary embodiment, the mounting portion 114 may include a top wall 114*a* and a side wall 114*b* perpendicular to the top wall 114*a*. The mounting portion 114 may have a cavity 112 defined by the top wall 114*a* and the side wall 114*b*. A plurality of through holes 113 may be provided in the top wall 114*a* and may be spaced apart from each other by a predetermined gap. The plurality of main rollers 115 may be rotatably mounted in the cavity 112 of the mounting portion 114, and a portion of each main roller 115 may protrude through the corresponding through hole 113 so that it may be located in the guide groove 111.

Figure 14:
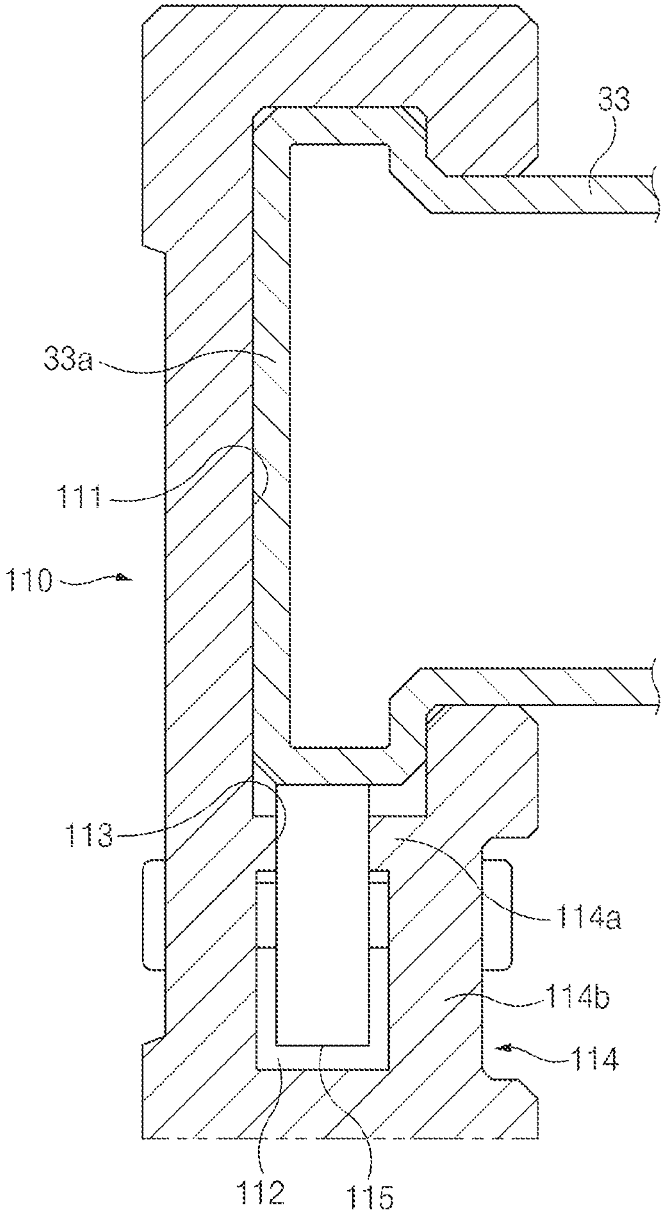
FIG. 14 illustrates a cross-sectional view, taken along line H-H of FIG. 9.

Referring to FIG. 14, each side extension portion 33 may have a guide portion 33*a* guided along the guide groove 111 of the corresponding guide rail 110, and the plurality of main rollers 115 may be in rolling contact with a bottom surface of the guide portion 33*a*.

Figure 15:
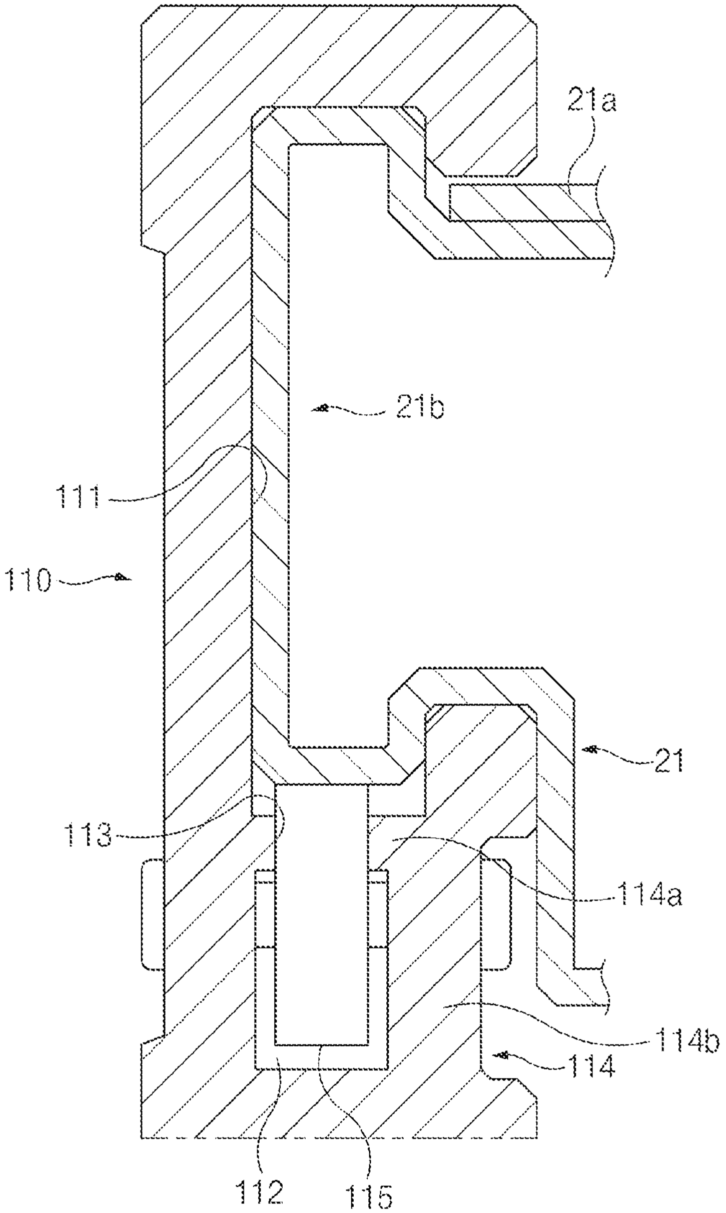
FIG. 15 illustrates a cross-sectional view, taken along line I-I of FIG. 9.

Referring to FIG. 15, each first side rail 21*b* of the first ramp platform 21 may slide along the corresponding guide rail 110 of the housing 11, and a bottom surface of the first side rail 21*b* may be in rolling contact with the main rollers 115 of the guide rail 110.

Figure 18:
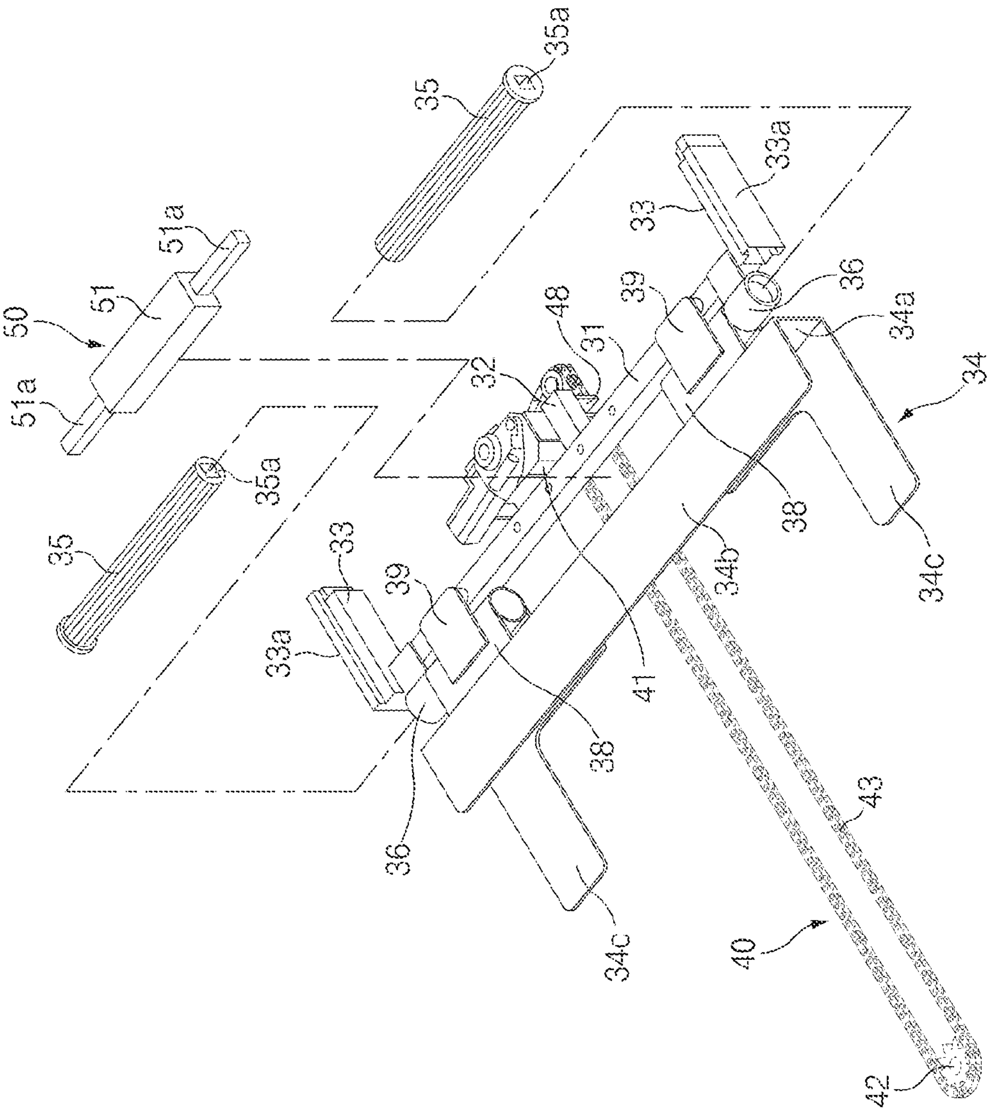
FIG. 18 illustrates an exploded perspective view of the hinge mechanism (as viewed in the direction indicated by arrow G of FIG. 4)

Referring to FIGS. 5 and 18, the hinge drive unit 50 may include a motor 51 mounted on the central portion of the moving body 31. The motor 51 may be a bidirectional motor operating clockwise and counterclockwise. The motor 51 may be a dual shaft motor having a pair of output shafts 51*a* facing each other, and the pair of output shafts 51*a* may extend from the motor 51 symmetrically. An axis of each output shaft 51*a* may be aligned with an axis of a motor housing of the motor 51. Each output shaft 51*a* may be a rectangular bar, and the motor 51 may have a rectangular shape.

Referring to FIG. 5, the motor 51 may be mounted on the central portion of the moving body 31 through a mounting bracket 52. The mounting bracket 52 may include a surround portion 52*a* surrounding the motor 51 and a fixed portion 52*b* fixed to the central portion of the moving body 31 using a fastener 52*c*.

Figure 16:
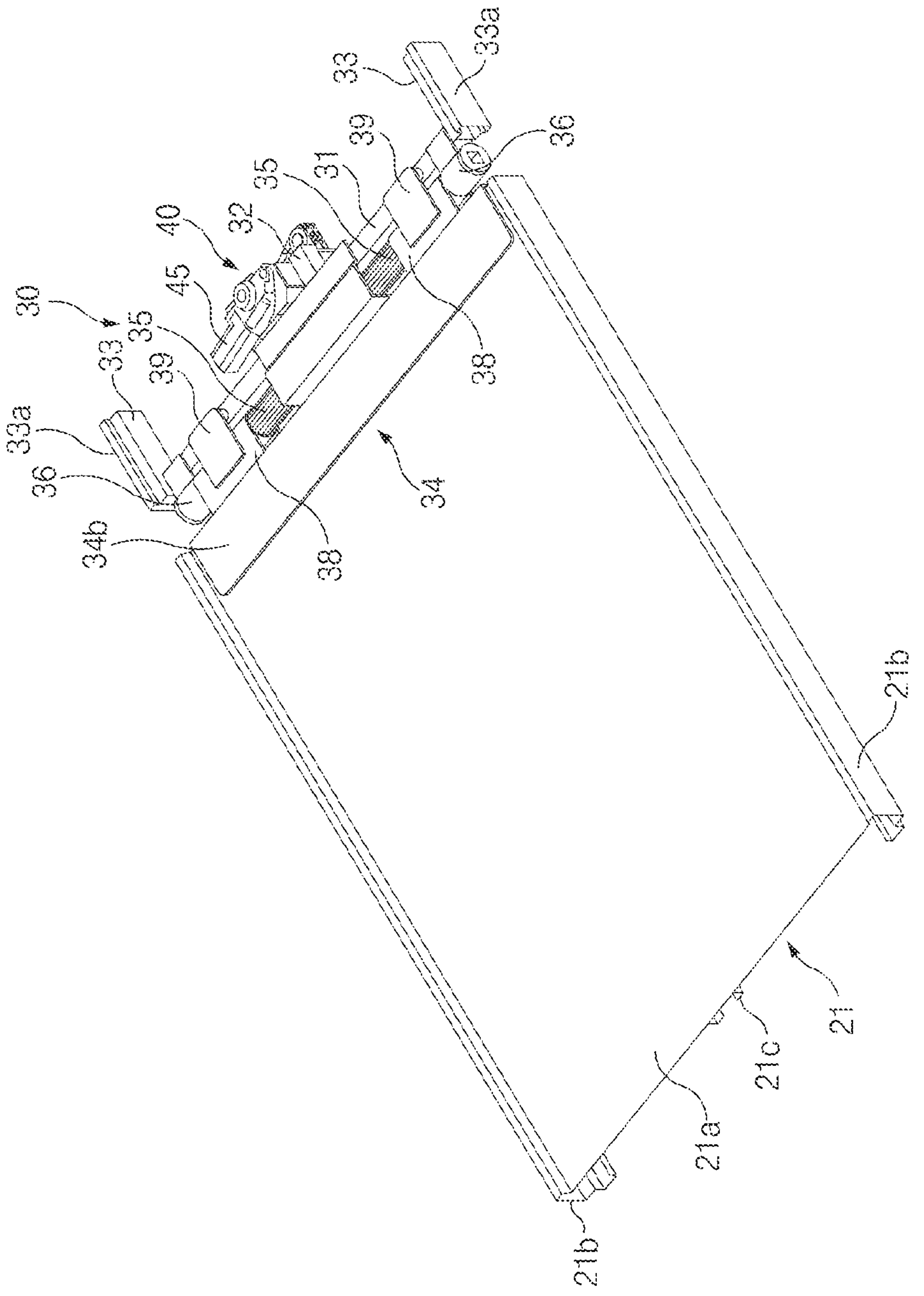
FIG. 16 illustrates a perspective view of the hinge mechanism and the ramp assembly (as viewed in the direction indicated by arrow G of FIG. 4)
Figure 17:
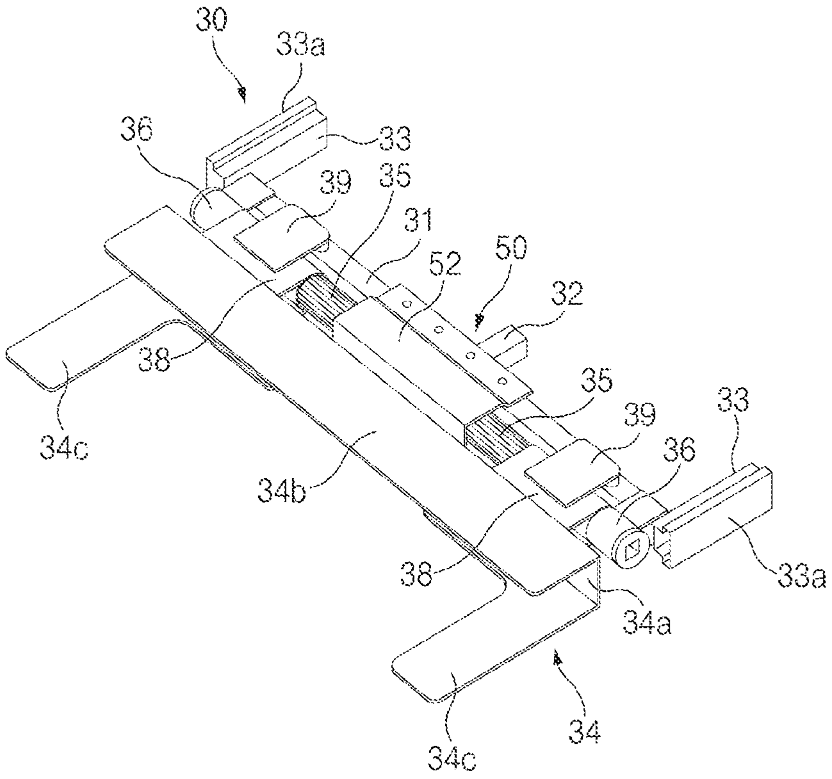
FIG. 17 illustrates a perspective view of the hinge mechanism (as viewed in the direction indicated by arrow G of FIG. 4)

Referring to FIGS. 16, 17, and 18, when the ramp assembly 20 is deployed from the housing 11, the motor 51 may allow the first ramp platform 21 to pivot through the pair of hinge shafts 35. The pair of output shafts 51*a* may be fixed to the pair of hinge shafts 35, respectively, and the pair of hinge shafts 35 may be rotated by the motor 51. As the motor 51 rotates the pair of hinge shafts 35, the first ramp platform 21 of the ramp assembly 20 may pivot around the hinge shafts 35. The pair of hinge shafts 35 may be fixedly connected to the first ramp platform 21 of the ramp assembly 20 through a pair of hinge lugs 38 and a bracket 34. The bracket 34 may be fixed to the trailing end portion of the first ramp platform 21 of the ramp assembly 20, and the pair of hinge lugs 38 may be integrally connected to the bracket 34 so that the pair of hinge lugs 38 may be fixedly connected to the first ramp platform 21 of the ramp assembly 20. Each hinge lug 38 may have a fitting hole, and each hinge shaft 35 may be fixed to the fitting hole of the corresponding hinge lug 38 through serration coupling. The bracket 34 may include a vertical wall 34*a*, a top wall 34*b* extending horizontally from a top end of the vertical wall 34*a*, and a bottom wall 34*c* extending horizontally from a bottom end of the vertical wall 34*a*. A pair of bushes 36 may be fixed to the moving body 31, and the hinge shafts 35 may be rotatably supported by the pair of corresponding bushes 36, respectively.

Each hinge shaft 35 may have a rectangular hole 35*a* corresponding to the output shaft 51*a* of the motor 51, and each output shaft 51*a* may be fitted into the hole 35*a* of the corresponding hinge shaft 35. The axis of the output shaft 51*a* may be aligned with an axis of the hinge shaft 35. Each output shaft 51*a* of the motor 51 may be press-fit into the hole 35*a* of the corresponding hinge shaft 35 so that the output shaft 51*a* of the motor 51 may be fixedly connected to the corresponding hinge shaft 35. That is, the pair of hinge shafts 35 may be directly rotated by the motor 51. As the motor 51 operates, the hinge shafts 35 may rotate clockwise and counterclockwise, and the first ramp platform 21 of the ramp assembly 20 may pivot around the hinge shafts 35 clockwise and counterclockwise.

Referring to FIGS. 16, 17, and 18, a pair of hinge stoppers 39 may be fixed to the pair of hinge lugs 38, respectively, and each hinge stopper 39 may extend from the corresponding hinge lug 38 toward the moving body 31. As the motor 51 of the hinge drive unit 50 rotates the hinge shafts 35 and the hinge lugs 38 clockwise, the first ramp platform 21 of the ramp assembly 20 may move to a horizontal position so that the hinge stoppers 39 may come into contact with the moving body 31.

Figure 19:
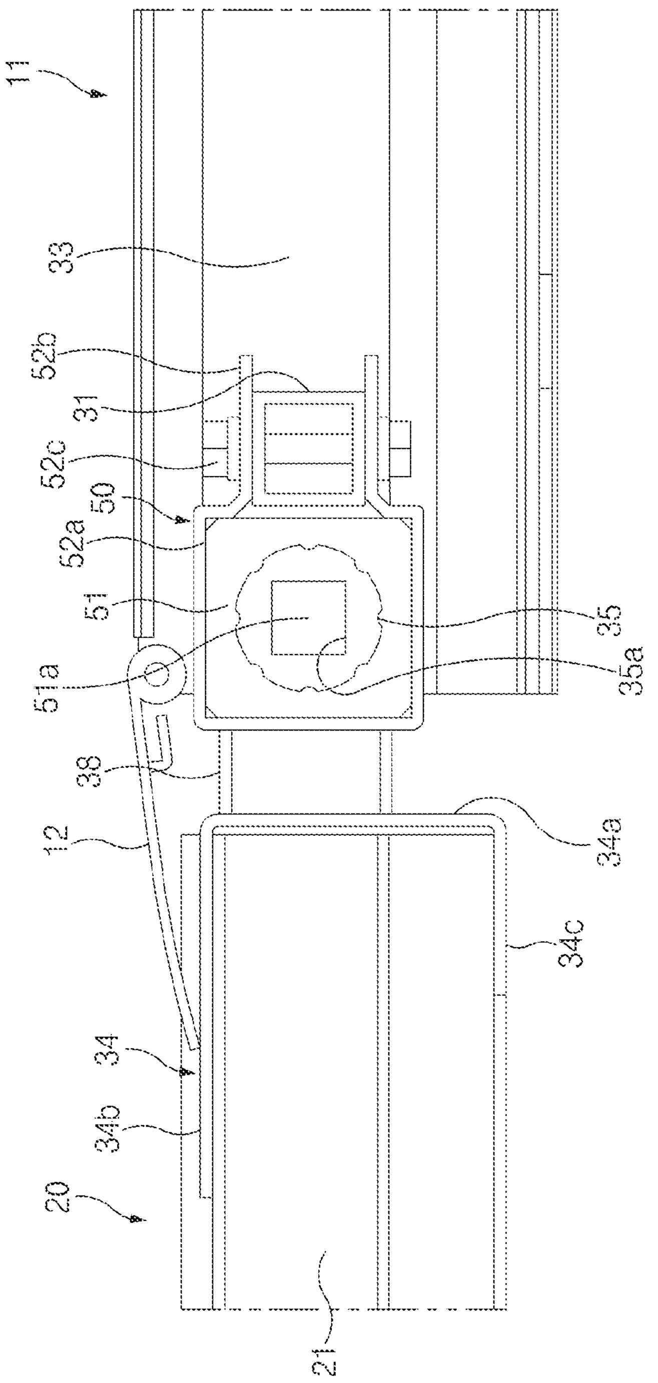
FIG. 19 illustrates a side sectional view of a ramp apparatus for a vehicle according to an exemplary embodiment of the present disclosure, in a state in which a ramp assembly is deployed from the housing.
Figure 20:
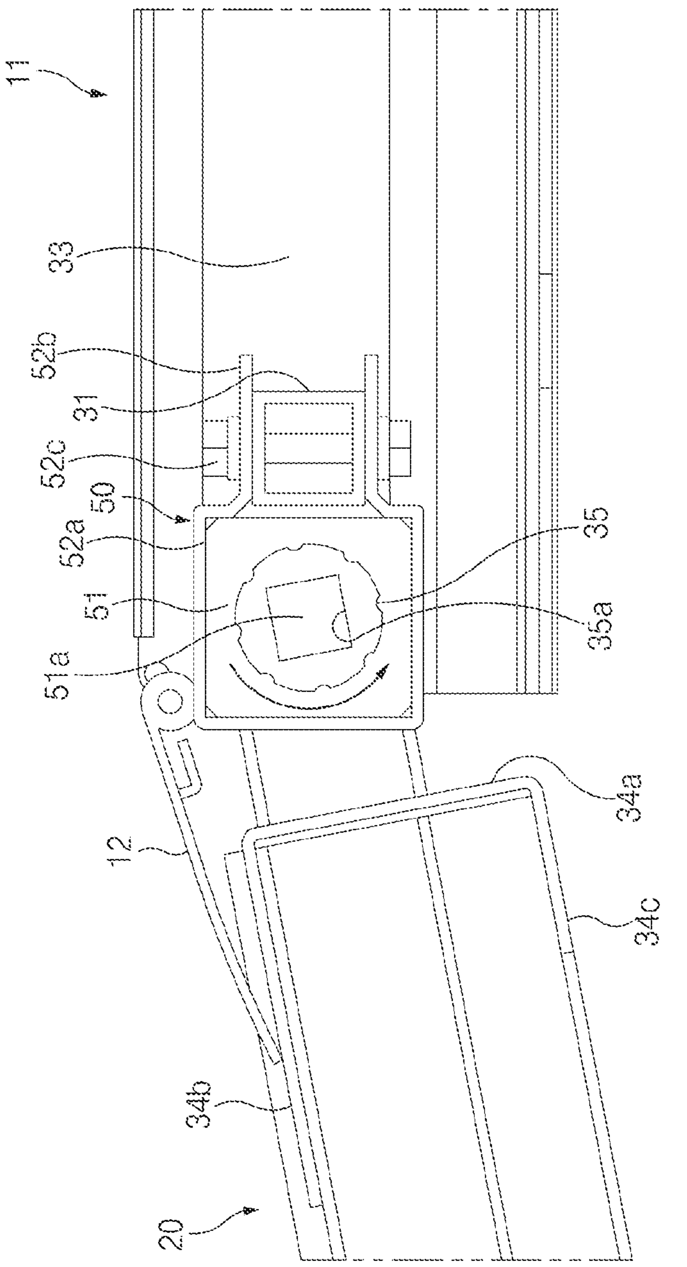
FIG. 20 illustrates a side sectional view of a state in which the ramp assembly illustrated in FIG. 19 is pivoted with respect to a hinge mechanism.

Specifically, after the ramp assembly 20 is fully deployed from the housing 11 by the moving body 31 and the moving mechanism 40, the motor 51 of the hinge drive unit 50 may rotate the hinge shafts 35 and the hinge lugs 38 clockwise and counterclockwise so that the ramp assembly 20 may move between the horizontal position (see FIG. 19) and an inclined position (see FIG. 20). Referring to FIG. 19, the horizontal position refers to a position in which the ramp assembly 20 is substantially parallel to the housing 11 as the motor 51 of the hinge drive unit 50 rotates the hinge shafts 35 and the hinge lugs 38 clockwise. Referring to FIG. 20, the inclined position refers to a position in which the ramp assembly 20 is inclined at a predetermined angle with respect to the housing 11 as the motor 51 of the hinge drive unit 50 rotates the hinge shafts 35 and the hinge lugs 38 counterclockwise.

In a state in which the ramp assembly 20 is fully deployed from the housing 11 by the moving body 31 and the moving mechanism 40, as the motor 51 of the hinge drive unit 50 rotates the hinge shafts 35 and the hinge lugs 38, the hinge stoppers 39 may come into contact with or be spaced apart from the moving body 31 of the hinge mechanism 30. That is, the hinge stoppers 39 may come into contact with or be spaced apart from the moving body 31 of the hinge mechanism 30 according to the rotation directions of the hinge shafts 35. In a state in which the ramp assembly 20 is fully deployed from the housing 11 by the moving body 31 and the moving mechanism 40, as the motor 51 of the hinge drive unit 50 rotates the hinge shafts 35 clockwise, the ramp assembly 20 may be moved to the horizontal position by the hinge drive unit 50, and the hinge stoppers 39 may come into contact with the moving body 31. In a state in which the ramp assembly 20 is fully deployed from the housing 11, as the motor 51 of the hinge drive unit 50 rotates the hinge shafts 35 counterclockwise, the ramp assembly 20 may be moved to the inclined position by the hinge drive unit 50, and the hinge stoppers 39 may be spaced apart from the moving body 31.

Referring to FIGS. 4, 9, and 10, the ramp apparatus 10 for a vehicle according to an exemplary embodiment of the present disclosure may include the moving mechanism 40 allowing the moving body 31 of the hinge mechanism 30 and the ramp assembly 20 to move. In particular, the moving mechanism 40 may be configured to allow the ramp assembly 20 to move between the stowed position (see FIG. 9) and the deployed position (see FIG. 10).

The moving mechanism 40 may be a chain drive mechanism including a drive sprocket 41 adjacent to the trailing end portion of the housing 11, a driven sprocket 42 adjacent to the leading end portion of the housing 11, a chain 43 connecting the drive sprocket 41 and the driven sprocket 42, a chain attachment 48 mounted on the chain 43, and a motor 45 driving the drive sprocket 41.

The drive sprocket 41 may be located adjacent to the trailing end portion of the housing 11. The drive sprocket 41 may be rotatably mounted on a bottom wall of the housing 11 through a shaft. The drive sprocket 41 may be rotated by the motor 45. The motor 45 may be a bidirectional motor operating clockwise and counterclockwise, and the drive sprocket 41 may rotate clockwise and counterclockwise by the operation of the motor 45. An output shaft of the motor 45 may be directly fixed to the drive sprocket 41 so that the motor 45 may directly rotate the drive sprocket 41. The motor 45 may be mounted on the bottom wall of the housing 11 through a mounting bracket 45*a*.

The moving mechanism 40 may further include tension pulleys 44*a* and 44*b* guiding the movement of the chain 43 and tensioning the chain 43. The two tension pulleys 44*a* and 44*b* may be additionally mounted on the mounting bracket 45*a*. The two tension pulleys 44*a* and 44*b* may be disposed adjacent to the drive sprocket 41 and the motor 45 in a cavity of the mounting bracket 45*a*. As the tension pulleys 44*a* and 44*b* maintain the tension of the chain 43, the degree of freedom in position of the motor 45 and in sizes of the sprockets 41 and 42 may be given.

The driven sprocket 42 may be disposed adjacent to the leading end portion of the housing 11. The driven sprocket 42 may be rotatably mounted on the bottom wall of the housing 11 through a shaft 44 (see FIG. 6).

The chain 43 may engage the drive sprocket 41 and the driven sprocket 42 and wrap the drive sprocket 41 and the driven sprocket 42 so that a movement path of the chain 43 may be defined by the drive sprocket 41 and the driven sprocket 42. The tension pulleys 44*a* and 44*b* may be disposed adjacent to the drive sprocket 41 to thereby guide the movement path of the chain 43 and subject the chain 43 to tension.

The chain attachment 48 may be mounted between chain elements of the chain 43. Referring to FIGS. 9 and 10, when the chain 43 moves, the chain attachment 48 may move in the same direction as a movement direction of the chain 43. The chain attachment 48 may be fixed to the moving body 31 of the hinge mechanism 30 using fasteners, welding, and/or the like. Accordingly, the chain attachment 48 may be connected to the ramp assembly 20 through the moving body 31. As the chain 43 is moved by the motor 45, the moving body 31 and the ramp assembly 20 may move in the same direction as the movement direction of the chain attachment 48.

When the drive sprocket 41 is rotated clockwise by the motor 45, the chain 43 may move according to the clockwise rotation of the drive sprocket 41. As illustrated in FIG. 9, the chain attachment 48 and the moving body 31 may move close to the drive sprocket 41, and accordingly the ramp assembly 20 may be fully stowed in the housing 11.

When the drive sprocket 41 is rotated counterclockwise by the motor 45, the chain 43 may move according to the counterclockwise rotation of the drive sprocket 41. As illustrated in FIG. 10, the chain attachment 48 and the moving body 31 may move close to the driven sprocket 42, and accordingly the ramp assembly 20 may be fully deployed from the housing 11.

The ramp apparatus 10 according to an exemplary embodiment of the present disclosure may include the drive mechanism 60 configured to drive the ramp platforms of the ramp assembly 20 telescopically. Specifically, the drive mechanism 60 may be configured to move the second ramp platform 22 telescopically with respect to the first ramp platform 21 and to move the third ramp platform 23 telescopically with respect to the second ramp platform 22.

Referring to FIG. 4, the drive mechanism 60 may be disposed at the central portion of the first ramp platform 21, the central portion of the second ramp platform 22, and the central portion of the third ramp platform 23. The drive mechanism 60 may include a drive sprocket 61, a driven sprocket 62 spaced apart from the drive sprocket 61, a chain 63 connecting the drive sprocket 61 and the driven sprocket 62, and a motor 65 driving the drive sprocket 61.

The drive sprocket 61 and the driven sprocket 62 may be rotatably mounted on the second ramp platform 22, and the drive sprocket 61 and the driven sprocket 62 may be spaced apart from each other in a longitudinal direction of the second ramp platform 22 on the second mounting portion 22*c* of the second ramp platform 22.

Referring to FIG. 5, the drive sprocket 61 may be rotatably mounted on the trailing end portion of the second ramp platform 22. Referring to FIG. 7, the drive sprocket 61 may be located at the central portion of the second ramp platform 22, and the drive sprocket 61 may have a mounting boss 61*a* extending upwardly. The drive sprocket 61 may be located in the cavity of the second mounting portion 22*c* of the second ramp platform 22. The second ramp plate 22*a* of the second ramp platform 22 may have a through hole 22*d*, and the second mounting portion 22*c* of the second ramp platform 22 may have a through hole 22*e* aligned with the through hole 22*d* of the second ramp plate 22*a*. The mounting boss 61*a* may extend through the through hole 22*d* of the second ramp plate 22*a* and the through hole 22*e* of the second mounting portion 22*c*.

Referring to FIG. 6, the driven sprocket 62 may be rotatably mounted on the leading end portion of the second ramp platform 22. Referring to FIG. 8, the driven sprocket 62 may be located at the central portion of the second ramp platform 22, and the driven sprocket 62 may have a shaft 62*a* extending downwardly. The driven sprocket 62 may be located in the cavity of the second mounting portion 22*c* of the second ramp platform 22.

The chain 63 may engage the drive sprocket 61 and the driven sprocket 62 and wrap the drive sprocket 61 and the driven sprocket 62 so that a movement path of the chain 63 may be defined by the drive sprocket 61 and the driven sprocket 62.

Referring to FIGS. 5 and 7, the motor 65 may be mounted on the trailing end portion of the second ramp platform 22 through a mounting bracket 65*a*. The motor 65 may be directly connected to the drive sprocket 61, and a central axis of the motor 65 may be aligned with a central axis of the drive sprocket 61. The motor 65 may be a bidirectional motor operating clockwise and counterclockwise, and the motor 65 may directly rotate the drive sprocket 61 clockwise and counterclockwise.

The drive sprocket 61, the driven sprocket 62, and the chain 63 may be disposed in the cavity of the second mounting portion 22*c* of the second ramp platform 22. As the motor 65 rotates the drive sprocket 61, and the chain 63 moves according to the rotation of the drive sprocket 61, the driven sprocket 62 may be rotated in the same direction as the rotation direction of the drive sprocket 61.

The drive mechanism 60 may move the second ramp platform 22 with respect to the first ramp platform 21 by the rotation of the drive sprocket 61. The drive mechanism 60 may further include a first pinion 71 coupled to the drive sprocket 61 and a first rack gear 72 meshing with the first pinion 71.

Referring to FIG. 5, the first pinion 71 may have a shaft 71*a* extending toward the drive sprocket 61. The shaft 71*a* of the first pinion 71 may be press-fit into a hole of the mounting boss 61*a* of the drive sprocket 61 so that the shaft 71*a* of the first pinion 71 may be coupled to the mounting boss 61*a* of the drive sprocket 61. As the drive sprocket 61 rotates clockwise or counterclockwise, the first pinion 71 may rotate in the same direction as the rotation direction of the drive sprocket 61. Referring to FIG. 7, the first pinion 71 may be rotatably received in the cavity of the first mounting portion 21*c* of the first ramp platform 21.

The first rack gear 72 may be fixed to the first mounting portion 21*c* of the first ramp platform 21, and the first rack gear 72 may extend along the central longitudinal axis of the first ramp platform 21. Referring to FIG. 7, the first mounting portion 21*c* of the first ramp platform 21 may have a groove 21*f* into which the first rack gear 72 is press-fit.

The first ramp platform 21 may be connected to the hinge mechanism 30, the first pinion 71 may be coupled to the drive sprocket 61, the first rack gear 72 may be fixed to the first ramp platform 21, and the first pinion 71 may mesh with the first rack gear 72. Since the first ramp platform 21 is connected to the hinge mechanism 30, the first ramp platform 21 cannot move relative to the second ramp platform 22. In this state, as the drive sprocket 61 rotates, the first pinion 71 may rotate in the same direction as the rotation direction of the drive sprocket 61 so that the first pinion 71 may move along a longitudinal direction of the first rack gear 72. As the first pinion 71 moves along the longitudinal direction of the first rack gear 72, the second ramp platform 22 may move relative to the first ramp platform 21. Accordingly, the second ramp platform 22 may be extended out from the cavity of the first ramp platform 21 or may be stowed in the cavity of the first ramp platform 21.

The drive mechanism 60 may move the third ramp platform 23 with respect to the second ramp platform 22 by the rotation of the driven sprocket 62. The drive mechanism 60 may further include a second pinion 73 coupled to the driven sprocket 62 and a second rack gear 74 meshing with the second pinion 73.

Referring to FIG. 6, the second pinion 73 may have a mounting boss 73*a* extending toward the driven sprocket 62. The shaft 62*a* of the driven sprocket 62 may be press-fit into a hole of the mounting boss 73*a* of the second pinion 73 so that the shaft 62*a* of the driven sprocket 62 may be coupled to the mounting boss 73*a* of the second pinion 73. As the driven sprocket 62 is rotated clockwise or counterclockwise, the second pinion 73 may rotate in the same direction as the rotation direction of the driven sprocket 62. Referring to FIG. 8, the second pinion 73 may be rotatably received in the cavity of the third mounting portion 23*c* of the third ramp platform 23.

Referring to FIG. 8, the third ramp plate 23*a* of the third ramp platform 23 may have a through hole 23*d*, and the third mounting portion 23*c* of the third ramp platform 23 may have a through hole 23*e* aligned with the through hole 23*d* of the third ramp plate 23*a*. The mounting boss 73*a* of the second pinion 73 may extend through the through hole 23*d* of the third ramp plate 23*a* and the through hole 23*e* of the third mounting portion 23*c*.

The second rack gear 74 may be fixed to the third mounting portion 23*c* of the third ramp platform 23, and the second rack gear 74 may extend along the central longitudinal axis of the third ramp platform 23. Referring to FIG. 8, the third mounting portion 23*c* of the third ramp platform 23 may have a groove 23*f* into which the second rack gear 74 is press-fit.

The second pinion 73 may be rotatably mounted on the leading end portion of the second ramp platform 22, the second pinion 73 may be coupled to the driven sprocket 62, the second rack gear 74 may be fixed to the third ramp platform 23, and the second pinion 73 may mesh with the second rack gear 74. As the driven sprocket 62 is rotated, the second pinion 73 may rotate in the same direction as the rotation direction of the driven sprocket 62 so that the second rack gear 74 may move along a longitudinal direction of the second ramp platform 22 by the rotation of the second pinion 73. As the second rack gear 74 moves along the longitudinal direction of the second ramp platform 22, the third ramp platform 23 may move relative to the second ramp platform 22. Accordingly, the third ramp platform 23 may be extended out from the cavity of the second ramp platform 22 or may be stowed in the cavity of the second ramp platform 22.

Referring to FIG. 23, the upper guide portion 211 of each first side rail 21*b* may protrude upwardly from the first ramp plate 21*a* by a predetermined height h1, the upper guide portion 221 of each second side rail 22*b* may protrude upwardly from the second ramp plate 22*a* by a predetermined height h2, and the upper guide portion 231 of each third side rail 23*b* may protrude upwardly form the third ramp plate 23*a* by a predetermined height h3. In a state in which the first ramp platform 21, the second ramp platform 22, and the third ramp platform 23 are fully extended, when a wheelchair moves along the first ramp platform 21, the second ramp platform 22, and the third ramp platform 23 fully extended out from the housing 11, the upper guide portion 211 of each first side rail 21*b*, the upper guide portion 221 of each second side rail 22*b*, and the upper guide portion 231 of each third side rail 23*b* may prevent the wheelchair from falling.

Figure 24:
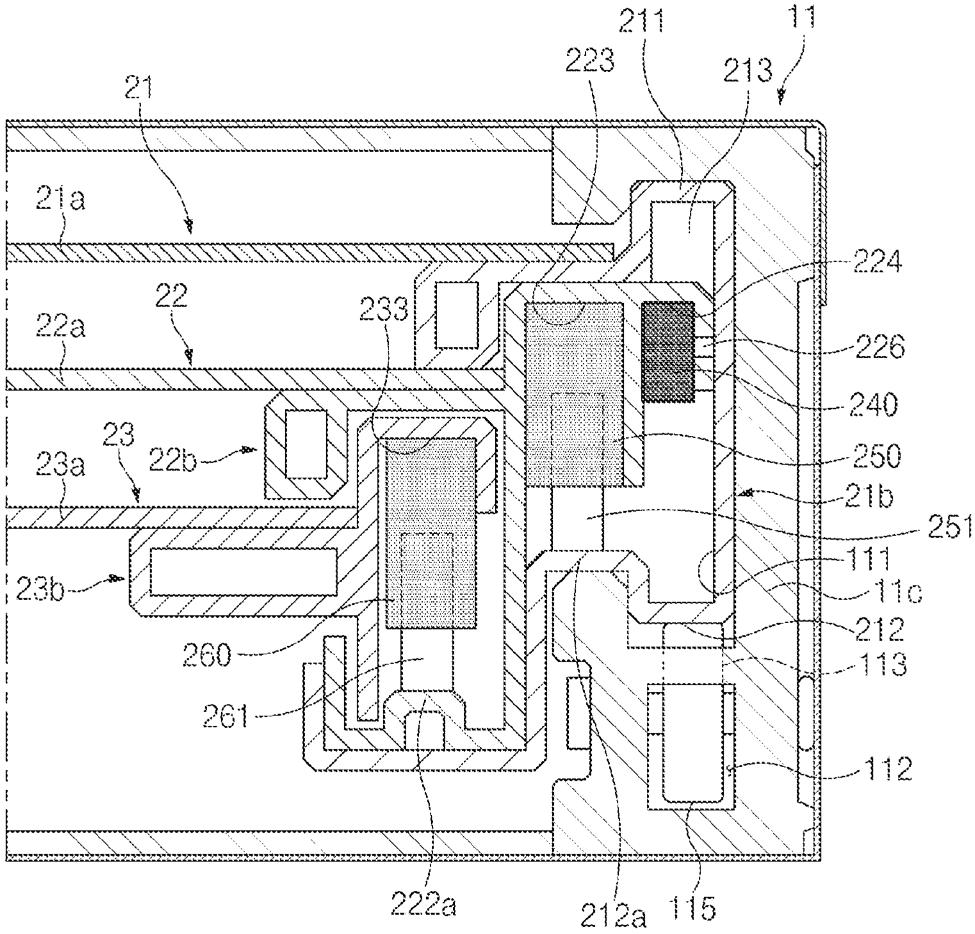
FIG. 24 illustrates a cross-sectional view of the side of a ramp assembly in a ramp apparatus for a vehicle according to an exemplary embodiment of the present disclosure.
Figure 25:
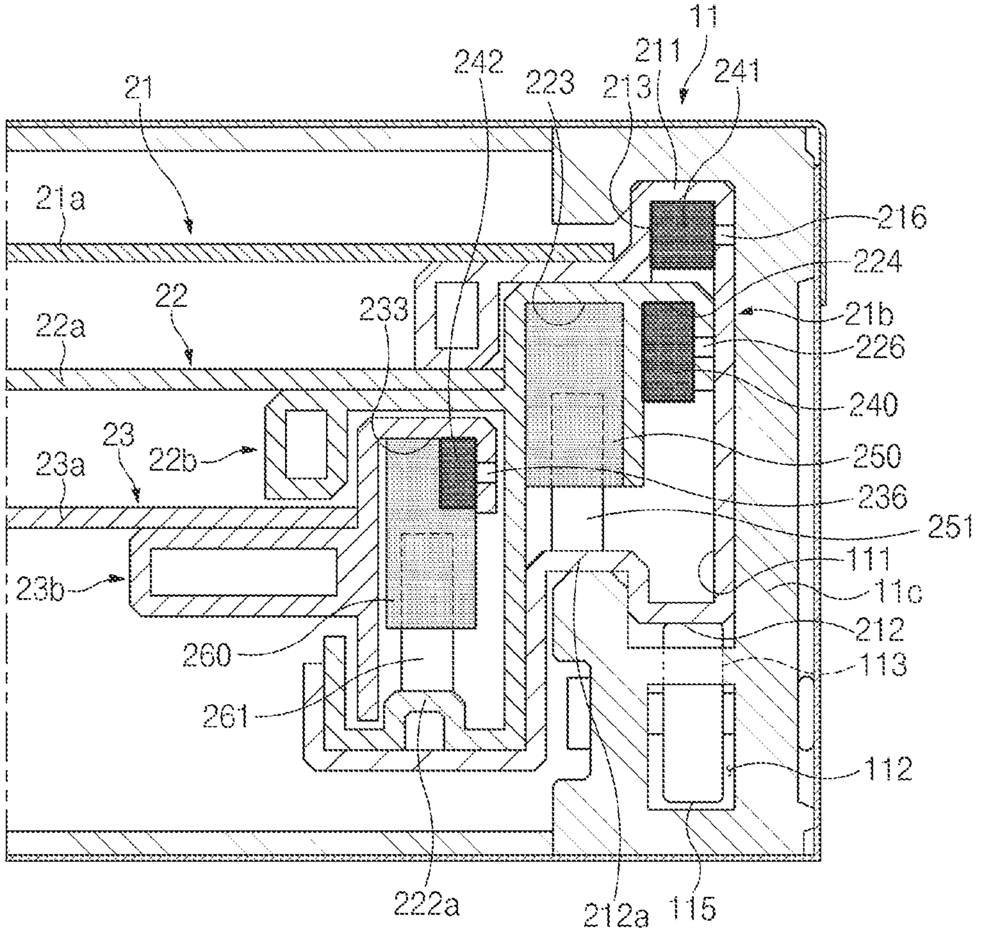
FIG. 25 illustrates a cross-sectional view of the side of a ramp assembly in a ramp apparatus for a vehicle according to another exemplary embodiment of the present disclosure.

Referring to FIGS. 24 and 25, the ramp apparatus 10 according to an exemplary embodiment of the present disclosure may further include an upper roller mechanism 250 mounted on the second ramp platform 22 and a lower roller mechanism 260 mounted on the third ramp platform 23.

The upper roller mechanism 250 may be fixedly mounted in the inner cavity 223 of each second side rail 22*b* of the second ramp platform 22. The upper roller mechanism 250 may include an upper roller case and at least one roller 251 rotatably mounted in the upper roller case. The roller 251 of the upper roller mechanism 250 may be in rolling contact with the contact portion 212*a* of each first side rail 21*b* of the first ramp platform 21. Accordingly, each second side rail 22*b* of the second ramp platform 22 may slide along the corresponding first side rail 21*b* of the first ramp platform 21 through the upper roller mechanism 250.

The lower roller mechanism 260 may be fixedly mounted in the cavity 233 of each third side rail 23*b* of the third ramp platform 23. The lower roller mechanism 260 may include a lower roller case, and at least one roller 261 rotatably mounted in the lower roller case. The roller 261 of the lower roller mechanism 260 may be in rolling contact with the contact portion 222*a* of each second side rail 22*b* of the second ramp platform 22. Accordingly, each third side rail 23*b* of the third ramp platform 23 may slide along the corresponding second side rail 22*b* of the second ramp platform 22 through the lower roller mechanism 260.

Referring to FIG. 24, the ramp apparatus 10 according to an exemplary embodiment of the present disclosure may further include a linear light indicator 240 mounted on each second side rail 22*b* of the second ramp platform 22, and the linear light indicator 240 may produce light. The linear light indicator 240 may extend along the length of each second side rail 22*b* of the second ramp platform 22. The linear light indicator 240 may be fixedly mounted in the outer cavity 224 of each second side rail 22*b*. Each second side rail 22*b* of the second ramp platform 22 may have a through hole 226 communicating with the outer cavity 224. The light may be transmitted from the linear light indicator 240 to the outside through the through hole 226, thereby easily indicating that the second ramp platform 22 is extended out from the first ramp platform 21. According to an exemplary embodiment, the linear light indicator 240 may include a light source such as LED and a light guide guiding light of the light source. The light guide may extend along a longitudinal direction of the second side rail 22*b*. According to another exemplary embodiment, the linear light indicator 240 may include a plurality of light sources spaced apart from each other along the longitudinal direction of the second side rail 22*b*, and each light source may be LED or the like.

Referring to FIG. 25, the ramp apparatus 10 according to an exemplary embodiment of the present disclosure may further include a linear light indicator 241 mounted on each first side rail 21*b* of the first ramp platform 21, and the linear light indicator 241 may produce light. The linear light indicator 241 may extend along the length of each first side rail 21*b* of the first ramp platform 21. The linear light indicator 241 may be fixedly mounted in the cavity 213 of each first side rail 21*b*, and the linear light indicator 241 may be located below the upper guide portion 211 of each first side rail 21*b*. Each first side rail 21*b* of the first ramp platform 21 may have a through hole 216 communicating with the cavity 213. The light may be transmitted from the linear light indicator 241 to the outside through the through hole 216, thereby easily indicating that the first ramp platform 21 is deployed from the housing 11. According to an exemplary embodiment, the linear light indicator 241 may include a light source such as LED and a light guide guiding light of the light source. The light guide may extend along a longitudinal direction of the first side rail 21*b*. According to another exemplary embodiment, the linear light indicator 241 may include a plurality of light sources spaced apart from each other along the longitudinal direction of the first side rail 21*b*, and each light source may be LED or the like.

Referring to FIG. 25, the ramp apparatus 10 according to an exemplary embodiment of the present disclosure may further include a linear light indicator 242 mounted on each third side rail 23*b* of the third ramp platform 23, and the linear light indicator 242 may produce light. The linear light indicator 242 may extend along the length of each third side rail 23*b* of the third ramp platform 23. The linear light indicator 242 may be fixedly mounted in the cavity 233 of each third side rail 23*b*, and the linear light indicator 242 together with the lower roller mechanism 260 may be disposed in the cavity 233 of the third side rail 23*b*. Each third side rail 23*b* of the third ramp platform 23 may have a through hole 236 communicating with the cavity 233. The light may be transmitted from the linear light indicator 242 to the outside through the through hole 236, thereby easily indicating that the third ramp platform 23 is extended out from the second ramp platform 22. According to an exemplary embodiment, the linear light indicator 242 may include a light source such as LED and a light guide guiding light of the light source. The light guide may extend along a longitudinal direction of the third side rail 23*b*. According to another exemplary embodiment, the linear light indicator 242 may include a plurality of light sources spaced apart from each other along the longitudinal direction of the third side rail 23*b*, and each light source may be LED or the like.

According to exemplary embodiments of the present disclosure, when the ramp assembly 20 is fully deployed from the housing 11, the front cover 12 may be configured to obliquely bridge between a top surface of the trailing end portion of the first ramp platform 21 and a top surface of the leading end portion of the housing 11. Accordingly, the front cover 12 may remove a height difference between the top surface of the trailing end portion of the first ramp platform 21 of the ramp assembly 20 and the top surface of the leading end portion of the housing 11.

Figure 26:
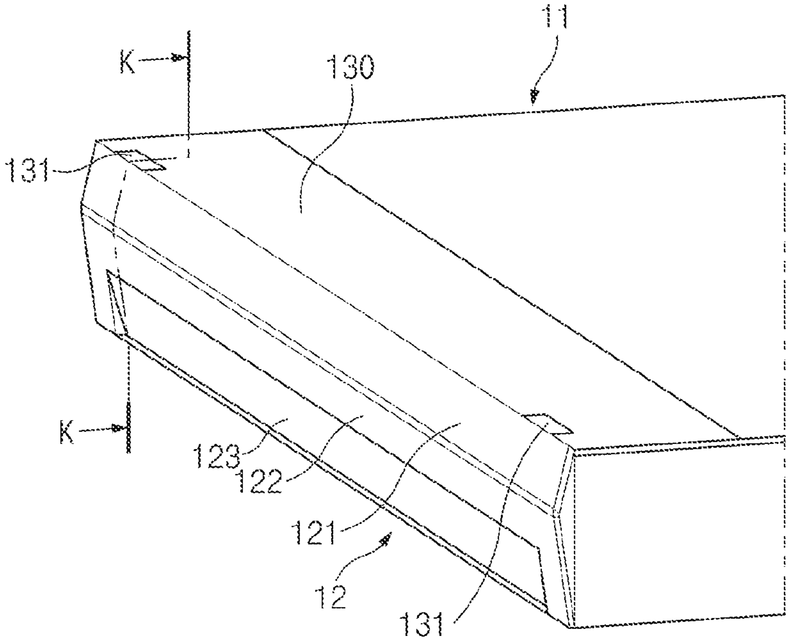
FIG. 26 illustrates a perspective view of a front cover mounted on a leading end portion of a housing in a ramp apparatus for a vehicle according to an exemplary embodiment of the present disclosure.

Referring to FIG. 26, the housing 11 may include a front upper panel 130 provided on a top end of the leading end portion thereof. The front upper panel 130 may have a pair of mounting recesses 131.

Figure 27:
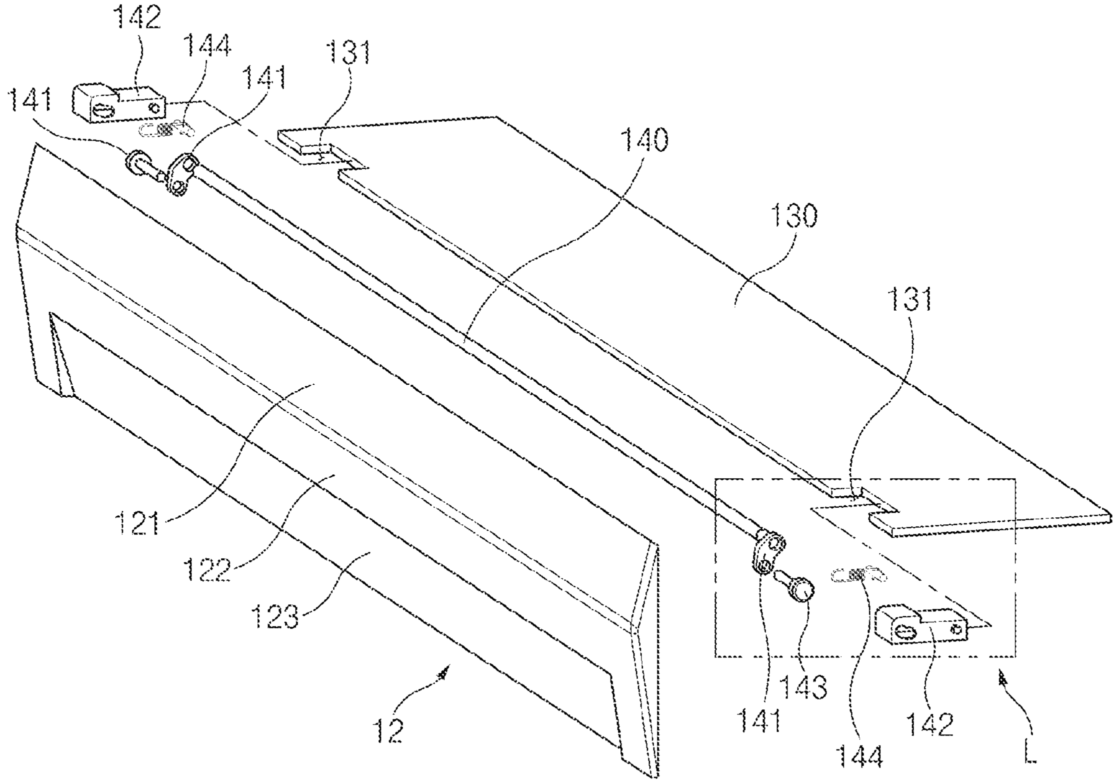
FIG. 27 illustrates an exploded perspective view of a front upper panel and a front cover of a housing in a ramp apparatus for a vehicle according to an exemplary embodiment of the present disclosure.
Figure 29:
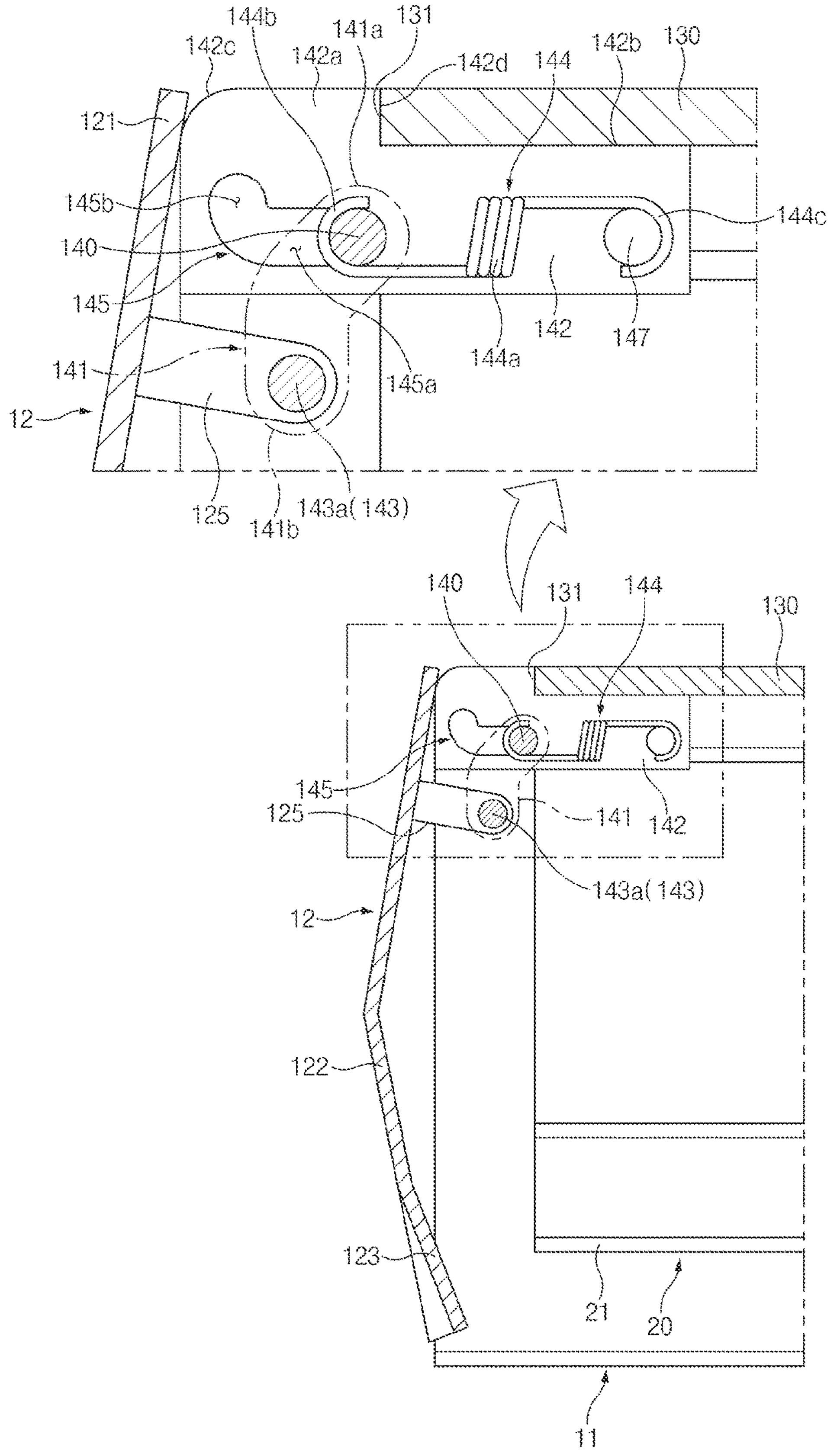
FIG. 29 illustrates a cross-sectional view, taken along line K-K of FIG. 26.

Referring to FIG. 27, the front cover 12 may include an upper portion 121, a lower portion 122 obliquely connected to the upper portion 121 at a predetermined angle, and a recessed portion 123 recessed from the lower portion 122 toward the housing 11. Referring to FIG. 29, the recessed portion 123 may extend from a bottom end of the lower portion 122, and the recessed portion 123 may be inclined with respect to the lower portion 122.

Referring to FIG. 27, the front cover 12 may be pivotally mounted on the front upper panel 130 of the housing 11 through a hinge shaft 140 and a pair of hinge brackets 142.

Figure 28:
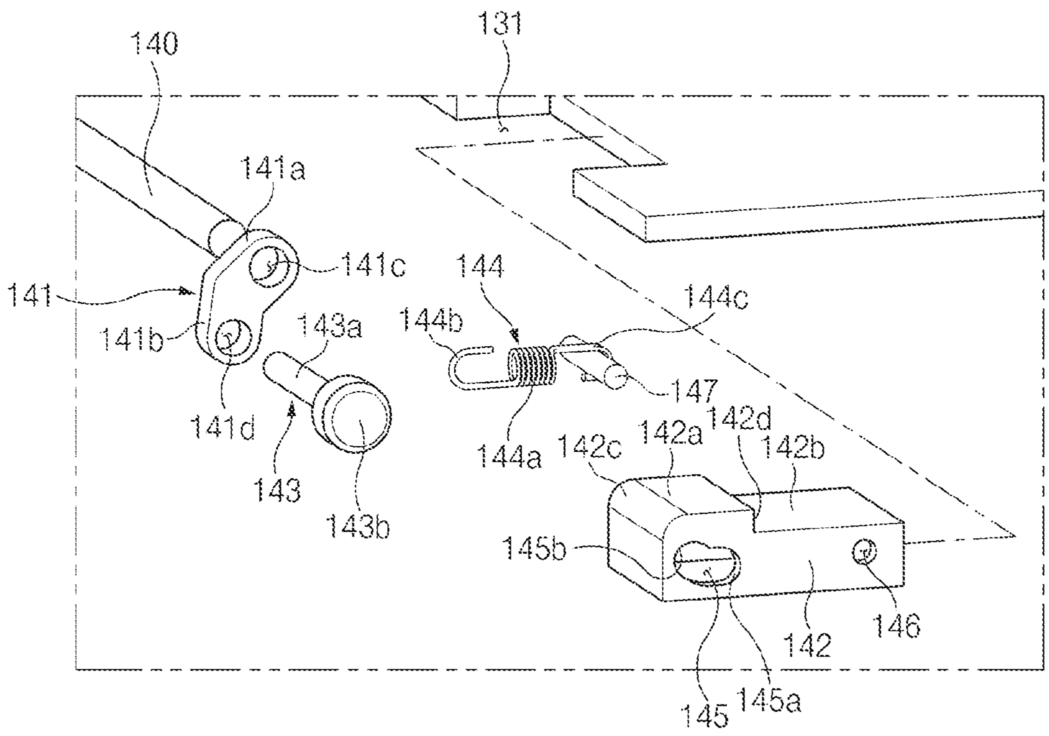
FIG. 28 illustrates an enlarged view of portion L of FIG. 27.

Referring to FIG. 27, the pair of hinge brackets 142 may be mounted in the pair of mounting recesses 131, respectively. Referring to FIG. 28, each hinge bracket 142 may have a projection 142*a* protruding from a flat top surface 142*b*. The projection 142*a* of each hinge bracket 142 may have a round portion 142*c* formed on a front portion thereof and a vertical surface 142*d* formed on a rear portion thereof. Each hinge bracket 142 may be fixed to the front upper panel 130 in a manner that the top surface 142*b* and the vertical surface 142*d* of the hinge bracket 142 tightly contact the front upper panel 130, and the projection 142*a* of the hinge bracket 142 may be received in the corresponding mounting recess 131. When the front cover 12 rotates around a rotation axis of the hinge shaft 140, the upper portion 121 of the front cover 12 may come into contact with the round portion 142*c* of the projection 142*a*.

A pair of hinge links 141 may be mounted on both ends of the hinge shaft 140, respectively. The hinge shaft 140 may be connected to the front cover 12 through the pair of hinge links 141.

Referring to FIG. 28, each hinge link 141 may include an upper portion 141*a* and a lower portion 141*b* obliquely connected to the upper portion 141*a* at a predetermined angle. The upper portion 141*a* may be connected to the hinge shaft 140. The upper portion 141*a* may have a hole 141*c*, and each end portion of the hinge shaft 140 may be received into the hole 141*c*. A portion of the upper portion 141*a* of each hinge link 141 may be rotatably and movably received in the corresponding mounting recess 131 of the front upper panel 130. The lower portion 141*b* may be connected to the upper portion 121 of the front cover 12, and the lower portion 141*b* may have a hole 141*d*.

The upper portion 121 of the front cover 12 may have a pair of hinge lugs 125 protruding toward the housing 11 by a predetermined length. The lower portion 141*b* of each hinge link 141 may be connected to the corresponding hinge lug 125 through a mounting bolt 143. The mounting bolt 143 may include a threaded portion 143*a* and a head portion 143*b*. The threaded portion 143*a* of the mounting bolt 143 may be screwed into the hole 141*d* of the lower portion 141*b* of the hinge link 141 and a hole of the hinge lug 125 of the front cover 12 so that the lower portion 141*b* of the hinge link 141 may be connected to the hinge lug 125. Accordingly, the hinge shaft 140 may be connected to the pair of hinge lugs 125 of the front cover 12 through the pair of hinge links 141.

Each end portion of the hinge shaft 140 may be movably mounted with respect to the corresponding hinge bracket 142. Each hinge bracket 142 may have a slot 145 extending in the longitudinal direction of the housing 11, and accordingly the slot 145 may extend along the movement direction of the ramp assembly 20. Each end portion of the hinge shaft 140 may be received in the slot 145 of the corresponding hinge bracket 142, and the end portion of the hinge shaft 140 may be movable in the slot 145 of the hinge bracket 142.

The slot 145 may include a straight portion 145*a* extending straightly along the longitudinal direction of the housing 11 and an inclined portion 145*b* extending upwardly and obliquely from the straight portion 145*a*. A top end of the inclined portion 145*b* may be located higher than the straight portion 145*a*, and each end portion of the hinge shaft 140 may move along the straight portion 145*a* and the inclined portion 145*b*. The inclined portion 145*b* may be close to the leading end portion of the housing 11, and the inclined portion 145*b* may be located in front of the straight portion 145*a*. As the first ramp platform 21 of the ramp assembly 20 is deployed or stowed, each end portion of the hinge shaft 140 may move along the straight portion 145*a* and the inclined portion 145*b* of the slot 145. The hinge shaft 140 may be configured to move between a retracted position in which the end portion of the hinge shaft 140 comes into contact with a rear end of the straight portion 145*a* of the slot 145 (see FIG. 29) and an advanced position in which the end portion of the hinge shaft 140 comes into contact with the top end of the inclined portion 145*b* of the slot 145 (see FIG. 31).

The hinge bracket 142 may have a through hole 146 located behind the slot 145, and a fixed pin 147 may be fixed to the through hole 146 of the hinge bracket 142.

The ramp apparatus 10 for a vehicle according to an exemplary embodiment of the present disclosure may include a spring member 144 elastically connecting each end portion of the hinge shaft 140 and the corresponding hinge bracket 142. The hinge shaft 140 may elastically move in the slot 145 of the hinge bracket 142 through the spring member 144, and the spring member 144 may allow the hinge shaft 140 to be biased toward the retracted position.

Referring to FIG. 29, the spring member 144 may include a coil portion 144*a*, a first anchor leg 144*b* extending from the coil portion 144*a* toward each end portion of the hinge shaft 140, and a second anchor leg 144*c* extending from the coil portion 144*a* toward the fixed pin 147. The first anchor leg 144*b* may be connected to the end portion of the hinge shaft 140, and the second anchor leg 144*c* may be connected to the fixed pin 147.

Referring to FIG. 29, as the coil portion 144*a* is compressed, each end portion of the hinge shaft 140 may be biased toward the retracted position by a biasing force (compression force) of the coil portion 144*a* of the spring member 144. Each end portion of the hinge shaft 140 may come into contact with the rear end of the straight portion 145*a* of the slot 145, and the front cover 12 may close the leading opening of the housing 11.

Figure 30:
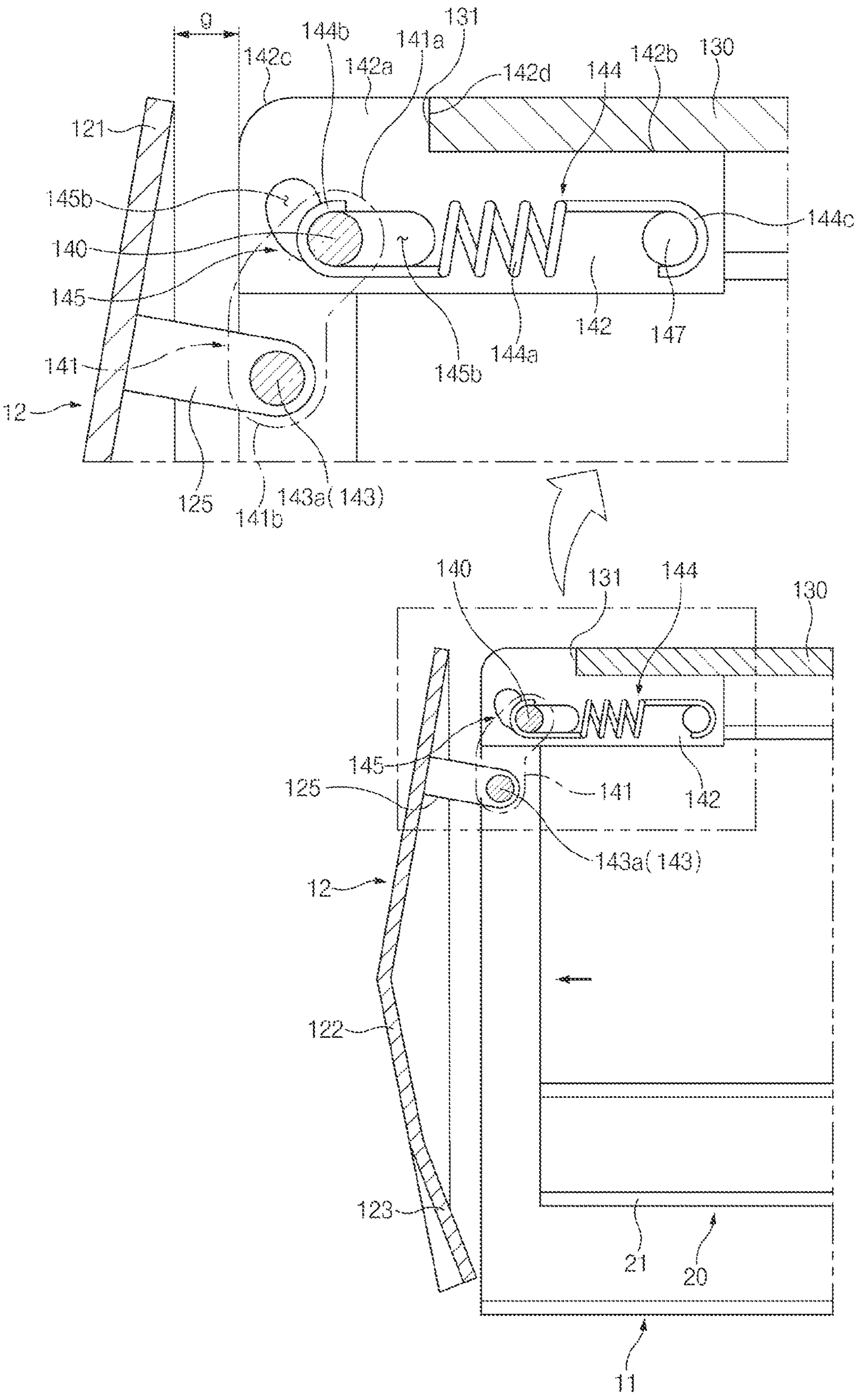
FIG. 30 illustrates a state in which a front cover is spaced apart from a leading end portion of a housing as a ramp assembly moves toward the leading end portion of the housing within a cavity of the housing in a ramp apparatus for a vehicle according to an exemplary embodiment of the present disclosure.

Referring to FIG. 30, when the first ramp platform 21 of the ramp assembly 20 moves toward the leading end portion of the housing 11 within the cavity of the housing 11, each end portion of the hinge shaft 140 may move from the straight portion 145*a* of the slot 145 toward the inclined portion 145*b* of the slot 145. Accordingly, the front cover 12 may be spaced apart from the leading end portion of the housing 11 by a predetermined gap g. As each end portion of the hinge shaft 140 moves toward the inclined portion 145*b*, the coil portion 144*a* of the spring member 144 may be extended.

Figure 31:
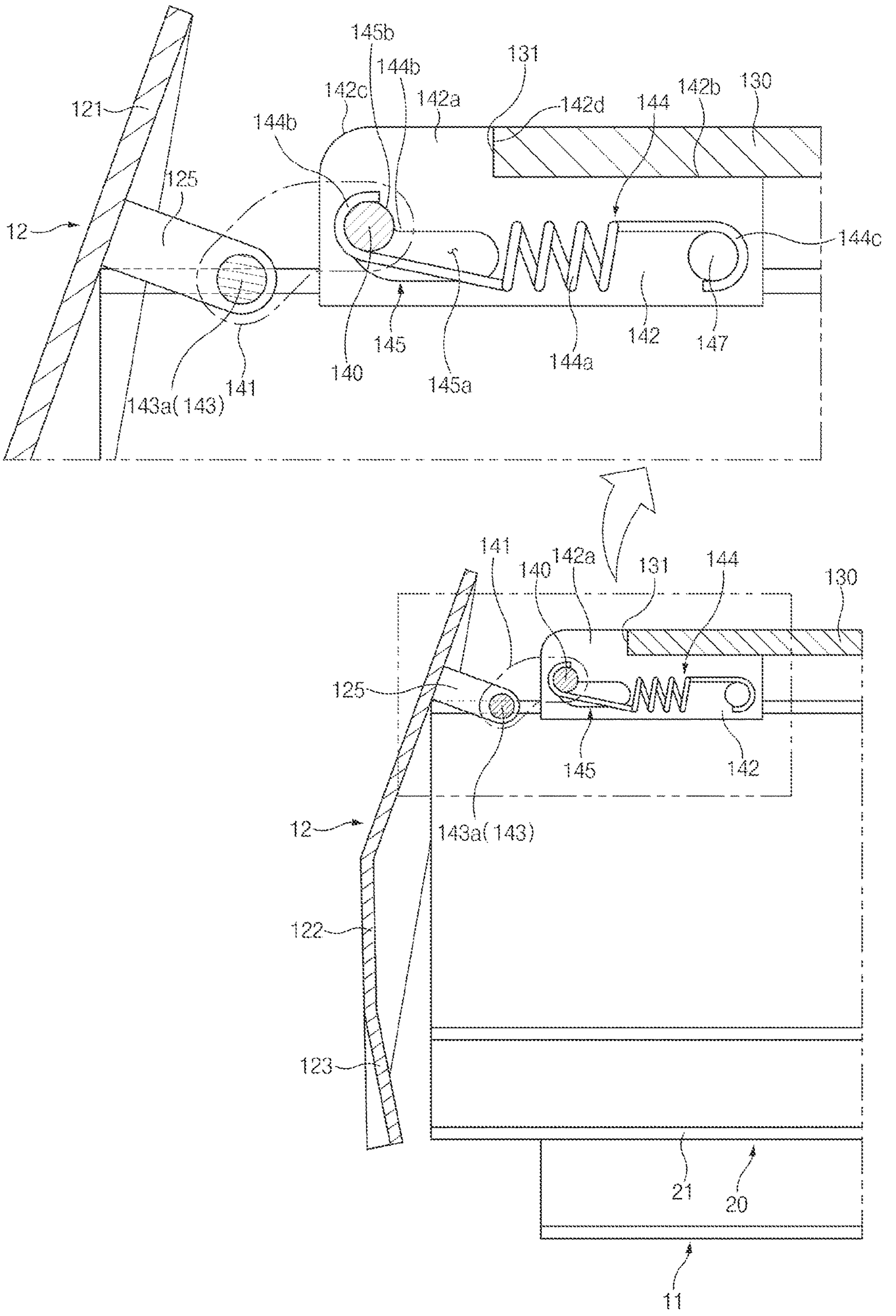
FIG. 31 illustrates a state in which a front cover moves away from a leading end portion of a housing and is inclined at a predetermined angle as a ramp assembly is moving out of the housing in a ramp apparatus for a vehicle according to an exemplary embodiment of the present disclosure.

Referring to FIG. 31, when the first ramp platform 21 of the ramp assembly 20 starts moving out of the cavity of the housing 11, the leading end portion of the first ramp platform 21 may move away from the leading end portion of the housing 11, the hinge shaft 140 may move upwardly along the inclined portion 145*b*, and each end portion of the hinge shaft 140 may come into contact with the top end of the inclined portion 145*b* of the slot 145. Accordingly, each end portion of the hinge shaft 140 may be in the advanced position, and the front cover 12 may move upwardly together with the hinge shaft 140 so that the front cover 12 may be inclined at a predetermined angle.

Figure 32:
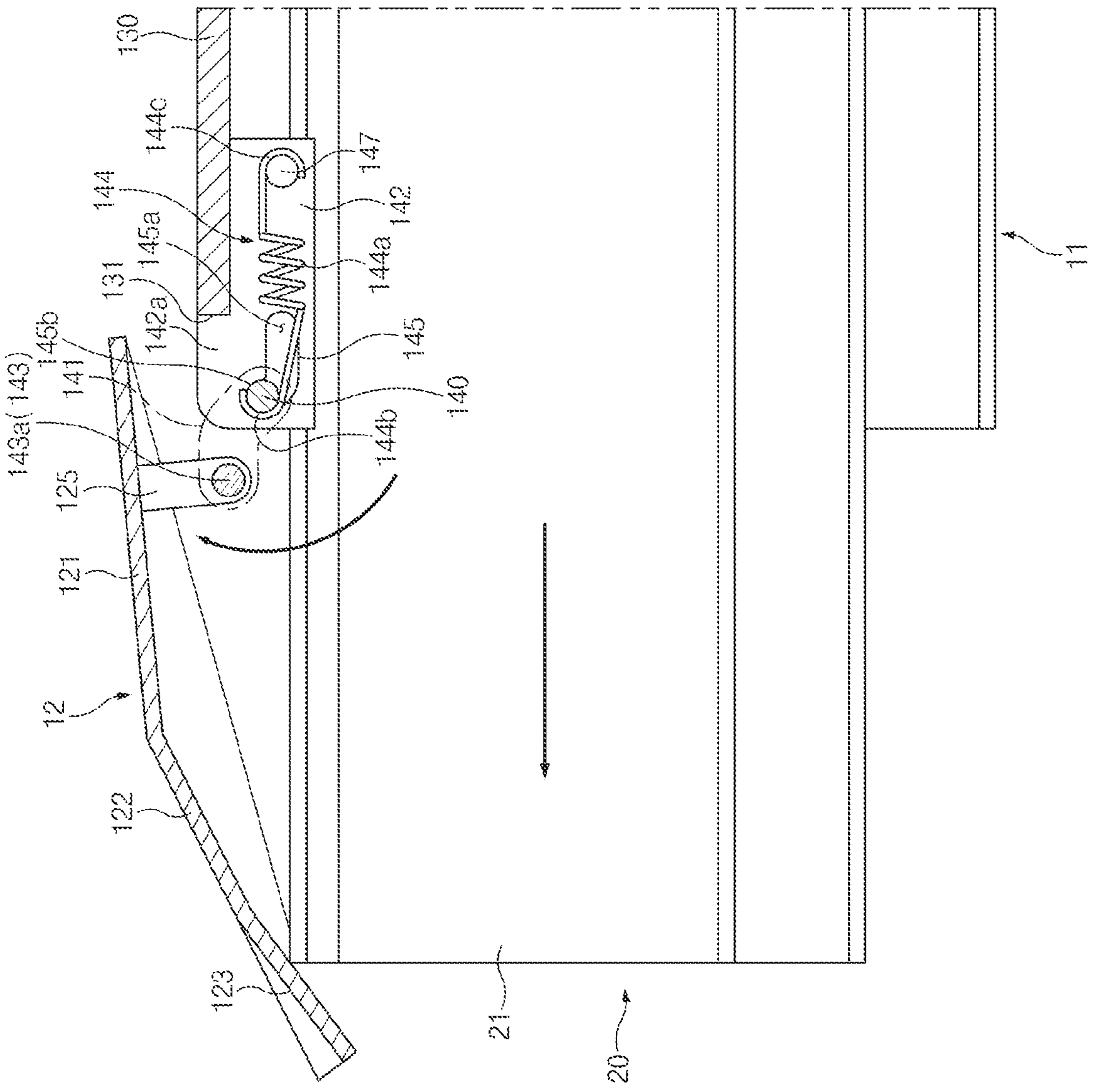
FIG. 32 illustrates a state in which a front cover moves away from a leading end portion of a housing and is in an uppermost position as a leading end portion of a first ramp platform pushes the front cover upwardly in a ramp apparatus for a vehicle according to an exemplary embodiment of the present disclosure.

Referring to FIG. 32, in a state in which the hinge shaft 140 is in the advanced position, when the first ramp platform 21 of the ramp assembly 20 is continuously moving out of the cavity of the housing 11, the leading end portion of the first ramp platform 21 may push the front cover 12 upwardly so that the front cover 12 may rotate upwardly around the rotation axis of the hinge shaft 140.

Figure 33:
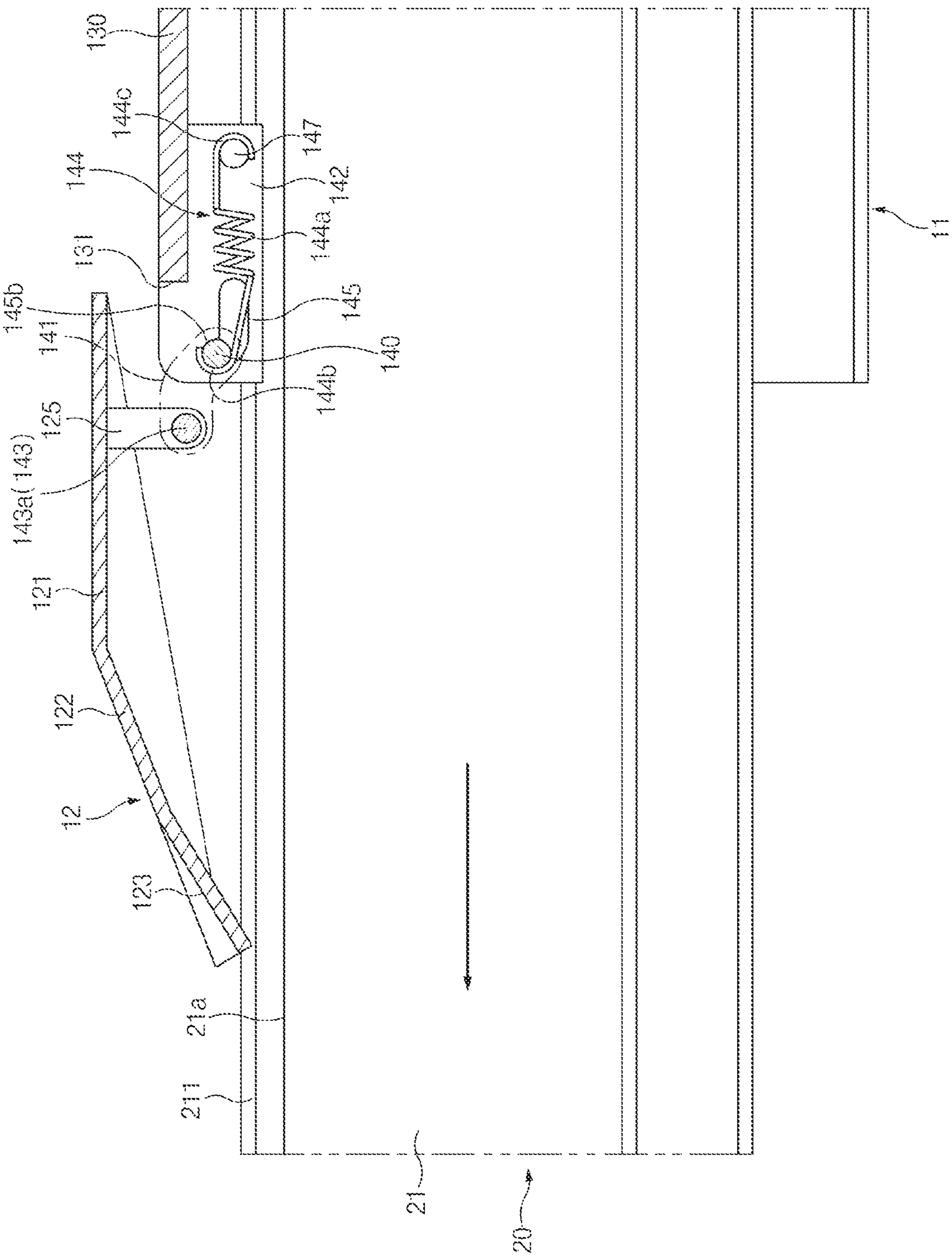
FIG. 33 illustrates a state in which a bottom end of a front cover comes into contact with a top surface of a first ramp platform while a ramp assembly is being deployed from a housing in a ramp apparatus for a vehicle according to an exemplary embodiment of the present disclosure.

Referring to FIG. 33, while the ramp assembly 20 is being deployed from the housing 11, a bottom end of the recessed portion 123 of the front cover 12 may come into contact with the top surface of the first ramp plate 21*a* of the first ramp platform 21 of the ramp assembly 20.

Figure 34:
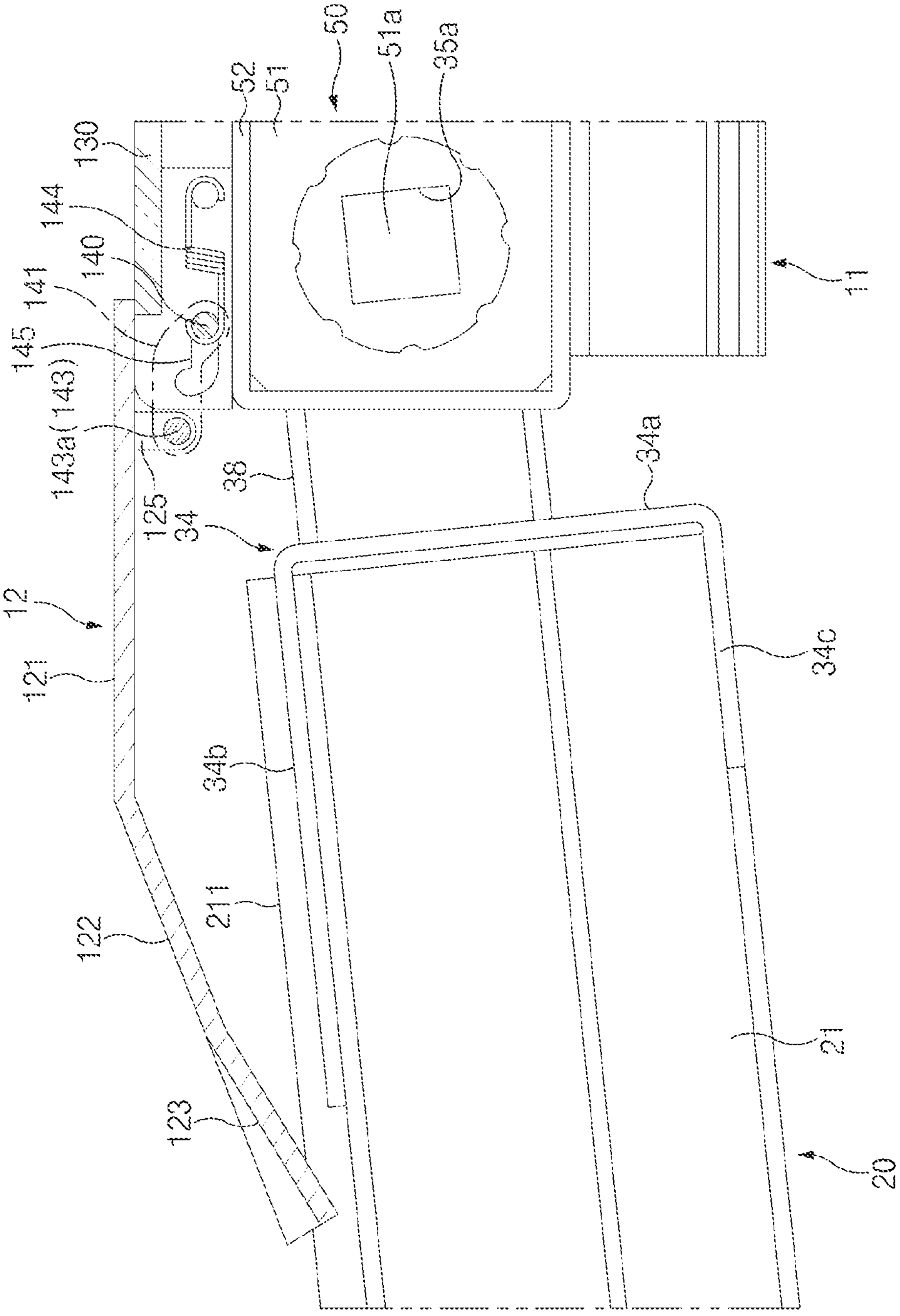
FIG. 34 illustrates a state in which a top end of a front cover comes into contact with a top surface of a housing and a bottom end of the front cover comes into contact with a top surface of a first ramp platform after a ramp assembly is fully deployed from a housing in a ramp apparatus for a vehicle according to an exemplary embodiment of the present disclosure.

Referring to FIG. 34, after the ramp assembly 20 is fully deployed from the housing 11, the first ramp platform 21 of the ramp assembly 20 may be moved to the inclined position by the hinge drive unit 50. As the hinge shaft 140 is moved to the retracted position by the spring member 144, a top end of the upper portion 121 of the front cover 12 may come into contact with the top surface of the housing 11 and the top surface of the projection 142*a* of the hinge bracket 142, and the bottom end of the recessed portion 123 of the front cover 12 may come into contact with the top surface of the first ramp plate 21*a* of the first ramp platform 21.

As described above, when the ramp assembly 20 is fully deployed from the housing 11, the lower portion 122 and the recessed portion 123 of the front cover 12 may be located obliquely between the top surface of the trailing end portion of the first ramp platform 21 and the top surface of the leading end portion of the housing 11, and accordingly the front cover 12 may remove a height difference between the top surface of the first ramp platform 21 of the ramp assembly 20 and the top surface of the housing 11. In particular, the top end of the upper portion 121 of the front cover 12 may come into contact with the top surface of the housing 11 and the top surface of the projection 142*a* of the hinge bracket 142, and the bottom end of the recessed portion 123 of the front cover 12 may come into contact with the top surface of the first ramp plate 21*a* of the first ramp platform 21 so that support strength and stiffness of the front cover 12 may be improved.

As set forth above, the ramp apparatus for a vehicle according to exemplary embodiments of the present disclosure may be designed to move telescopically from the vehicle body to the ground or vice versa. The ramp assembly may be designed to allow the ramp platforms to be deployed/extended or retracted so that the overall deployment length of the ramp assembly may be relatively increased, and accordingly the slope of the ramp assembly may be significantly reduced.

According to exemplary embodiments of the present disclosure, when the ramp assembly is fully deployed from the housing, the front cover may be located obliquely between the trailing end portion of the first ramp platform and the leading end portion of the housing, and accordingly the front cover may remove a height difference between the top surface of the ramp assembly and the top surface of the housing. In particular, the top end of the front cover may come into contact with the top surface of the housing, and the bottom end of the front cover may come into contact with the top surface of the first ramp platform so that the support strength and stiffness of the front cover may be improved.

According to exemplary embodiments of the present disclosure, the ramp assembly may be designed to be deployed from or stowed in the housing mounted on the vehicle body so that the storage space (stowage) of the ramp assembly may be optimized. By making the ramp apparatus compact, a sufficient battery mounting space may be secured.

According to exemplary embodiments of the present disclosure, the ramp assembly may be deployed from and stowed in the housing by the moving mechanism, and the telescopic ramp platforms may be extended and retracted by the drive mechanism so that the operation speed of the ramp apparatus may be significantly increased when the ramp platforms are extended and retracted.

According to exemplary embodiments of the present disclosure, the deployment length of the ramp assembly may be adjusted according to selective operations of the moving mechanism and the drive mechanism so that the ramp apparatus may be used for various purposes. For example, when only the moving mechanism and the hinge mechanism operate, the ramp assembly may be in the retracted state so that the length of the ramp assembly may be minimized, which allows the ramp assembly to be used in a state of being deployed short.

According to exemplary embodiments of the present disclosure, the motor of the moving mechanism, the motor of the hinge drive unit, and the motor of the drive mechanism may be controlled in an on/off manner so that the operation of the ramp apparatus may be performed very efficiently.

According to exemplary embodiments of the present disclosure, the first side rail of the first ramp platform may have the channel-shaped cross section that is open to the second ramp platform and the third ramp platform, and the second side rail of the second ramp platform may have the channel-shaped cross section that is open to the third ramp platform so that a foreign object may be prevented from being stuck between the first side rail of the first ramp platform, the second side rail of the second ramp platform, and the third side rail of the third ramp platform.

According to exemplary embodiments of the present disclosure, the first ramp plate of the first ramp platform and the second ramp plate of the second ramp platform may be spaced apart from each other by a predetermined gap, and the second ramp plate of the second ramp platform and the third ramp plate of the third ramp platform may be spaced apart from each other by a predetermined gap. Accordingly, even when at least one of the first ramp plate, the second ramp plate, and the third ramp plate is deformed, the deformation may not affect the movement of the first ramp platform, the movement of the second ramp platform, and the movement of the third ramp platform.

According to exemplary embodiments of the present disclosure, the linear light indicator may be mounted on at least one of the first side rail of the first ramp platform, the second side rail of the second ramp platform, and the third side rail of the third ramp platform, so it can be easily recognized that the first ramp platform, the second ramp platform, and/or the third ramp platform are extended out.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A ramp apparatus for a vehicle, the ramp apparatus comprising:

a housing mounted on a vehicle body;

a ramp assembly movable between a stowed position in which the ramp assembly is stowed in a cavity of the housing and a deployed position in which the ramp assembly is deployed or extended from the cavity of the housing, the ramp assembly comprising one or more ramp platforms telescopically connected to each other; and a front cover bridging between a leading end portion of the housing and a trailing end portion of the ramp assembly in a state in which the ramp assembly is in the deployed position, wherein the housing comprises a front upper panel provided on a top end of the leading end portion of the housing, wherein the front cover is pivotally mounted on the front upper panel through a hinge shaft and a hinge bracket, and wherein the hinge shaft is connected to the front cover through a hinge link.

2. The ramp apparatus according to claim 1, wherein the hinge link comprises:

an upper portion connected to the hinge shaft; and a lower portion connected to the front cover and obliquely connected to the upper portion at a predetermined angle.

3. The ramp apparatus according to claim 2, wherein:

the front cover has a hinge lug protruding toward the housing; and the lower portion of the hinge link is connected to the hinge lug through a mounting bolt.

4. The ramp apparatus according to claim 1, wherein:

the front upper panel has a mounting recess; and the hinge bracket is mounted in the mounting recess.

5. The ramp apparatus according to claim 4, wherein:

the hinge bracket has a slot extending in a longitudinal direction of the housing; and an end portion of the hinge shaft is movably received in the slot of the hinge bracket.

6. The ramp apparatus according to claim 5, wherein the slot comprises:

a straight portion extending straightly along the longitudinal direction of the housing; and an inclined portion in front of the straight portion and extending upwardly and obliquely from the straight portion.

7. The ramp apparatus according to claim 6, wherein the hinge shaft is movable between a retracted position in which the end portion of the hinge shaft comes into contact with a rear end of the straight portion of the slot and an advanced position in which the end portion of the hinge shaft comes into contact with a top end of the inclined portion of the slot.

8. The ramp apparatus according to claim 7, further comprising a spring member elastically connecting the hinge shaft and the hinge bracket, wherein the spring member is configured to allow the hinge shaft to be biased toward the retracted position.

9. A ramp apparatus for a vehicle, the ramp apparatus comprising:
- a housing mounted on a vehicle body;
- a ramp assembly movable between a stowed position in which the ramp assembly is stowed in a cavity of the housing and a deployed position in which the ramp assembly is deployed or extended from the cavity of the housing, the ramp assembly comprising:
  - a first ramp platform telescopically movable with respect to the housing;
  - a second ramp platform telescopically movable with respect to the first ramp platform; and
  - a third ramp platform telescopically movable with respect to the second ramp platform; and
- a front cover bridging between a leading end portion of the housing and a trailing end portion of the ramp assembly in a state in which the ramp assembly is in the deployed position,
- wherein the housing comprises a front upper panel provided on a top end of the leading end portion of the housing,
- wherein the front cover is pivotally mounted on the front upper panel through a first hinge shaft and a hinge bracket, and
- wherein the first hinge shaft is connected to the front cover through a hinge link.

10. The ramp apparatus according to claim 9, wherein:
- the hinge bracket is mounted in a mounting recess of the front upper panel and comprises a slot extending in a longitudinal direction of the housing; and
- an end portion of the first hinge shaft is movably received in the slot of the hinge bracket.

11. The ramp apparatus according to claim 9, further comprising a hinge mechanism configured to move the first ramp platform between the stowed position and the deployed position and to allow the first ramp platform to pivot with respect to the housing in a state in which the first ramp platform is in the deployed position.

12. The ramp apparatus according to claim 11, wherein the hinge mechanism comprises:
- a moving body connected to the first ramp platform through a second hinge shaft;
- a hinge drive unit mounted on the moving body; and
- a moving mechanism configured to allow the moving body to move.

13. The ramp apparatus according to claim 9, further comprising a drive mechanism configured to move the second ramp platform and the third ramp platform.

14. The ramp apparatus according to claim 13, wherein the drive mechanism comprises:
- a drive sprocket rotatably mounted on the second ramp platform;
- a driven sprocket rotatably mounted on the second ramp platform and spaced apart from the drive sprocket;
- a chain connecting the drive sprocket and the driven sprocket; and
- a motor driving the drive sprocket.

15. The ramp apparatus according to claim 14, wherein the drive mechanism is configured to move the second ramp platform with respect to the first ramp platform by a rotation of the drive sprocket and to move the third ramp platform with respect to the second ramp platform by the rotation of the driven sprocket.

16. The ramp apparatus according to claim 15, wherein the drive mechanism further comprises:
- a first pinion coupled to the drive sprocket; and
- a first rack gear mounted on the first ramp platform and meshing with the first pinion.

17. The ramp apparatus according to claim 15, wherein the drive mechanism further comprises:
- a second pinion coupled to the driven sprocket; and
- a second rack gear mounted on the third ramp platform and meshing with the second pinion.

18. A ramp apparatus for a vehicle, the ramp apparatus comprising:
- a housing mounted on a vehicle body;
- a ramp assembly movable between a stowed position in which the ramp assembly is stowed in a cavity of the housing and a deployed position in which the ramp assembly is deployed or extended from the cavity of the housing, the ramp assembly comprising one or more ramp platforms telescopically connected to each other; and
- a front cover bridging between a leading end portion of the housing and a trailing end portion of the ramp assembly in a state in which the ramp assembly is in the deployed position,
- wherein the housing comprises a front upper panel provided on a top end of the leading end portion of the housing,
- wherein the front cover is pivotally mounted on the front upper panel through a hinge shaft and a hinge bracket,
- wherein the front upper panel has a mounting recess,
- wherein the hinge bracket is mounted in the mounting recess,
- wherein the hinge bracket has a slot extending in a longitudinal direction of the housing,
- wherein an end portion of the hinge shaft is movably received in the slot of the hinge bracket,
- wherein the slot comprises a straight portion extending straightly along the longitudinal direction of the housing and an inclined portion in front of the straight portion and extending upwardly and obliquely from the straight portion, and
- wherein the hinge shaft is movable between a retracted position in which the end portion of the hinge shaft comes into contact with a rear end of the straight portion of the slot and an advanced position in which the end portion of the hinge shaft comes into contact with a top end of the inclined portion of the slot.

19. The ramp apparatus according to claim 18, further comprising a spring member elastically connecting the hinge shaft and the hinge bracket, wherein the spring member is configured to allow the hinge shaft to be biased toward the retracted position.

20. The ramp apparatus according to claim 18, further comprising:
- a hinge link connecting the hinge shaft to the front cover, wherein:
- the hinge link comprises:
  - an upper portion connected to the hinge shaft; and
  - a lower portion connected to the front cover and obliquely connected to the upper portion at a predetermined angle;
- the front cover has a hinge lug protruding toward the housing; and
- the lower portion of the hinge link is connected to the hinge lug.

* * * * *